United States Patent [19]
Ishida et al.

[11] Patent Number: 5,457,755
[45] Date of Patent: Oct. 10, 1995

[54] FIGURE PROCESSING APPARATUS

[75] Inventors: Yoshihiro Ishida, Kawasaki; Junichi Shishizuka, Tokyo; Yoshinobu Mita, Kawasaki; Miyuki Enokida, Yokohama, all of Japan

[73] Assignee: Canon Kabushiki Kaisha, Tokyo, Japan

[21] Appl. No.: 367,780

[22] Filed: Jan. 3, 1995

Related U.S. Application Data

[63] Continuation of Ser. No. 137,812, Oct. 19, 1993, abandoned, which is a continuation of Ser. No. 911,786, Jul. 10, 1992, abandoned, which is a continuation of Ser. No. 476,619, Feb. 7, 1990, abandoned.

[30] Foreign Application Priority Data

Feb. 8, 1989 [JP] Japan ................. 1-27379
Feb. 8, 1989 [JP] Japan ................. 1-27380
May 8, 1989 [JP] Japan ................. 1-113781

[51] Int. Cl.$^6$ ........................ G06K 9/20
[52] U.S. Cl. ........................ 382/324
[58] Field of Search ........................ 382/1, 22, 23, 382/25, 44, 45, 56, 57, 68; 395/133–139; 345/121, 123, 126, 127, 129, 130; G06K 9/00, 7/20

[56] References Cited

U.S. PATENT DOCUMENTS

| | | | |
|---|---|---|---|
| 3,050,711 | 8/1962 | Harmon | 382/68 |
| 4,685,070 | 8/1987 | Flinchbaugh | 340/747 |
| 4,686,522 | 8/1987 | Hernandez et al. | 340/747 |
| 4,688,181 | 8/1987 | Cottrell et al. | 340/747 |
| 4,698,779 | 10/1987 | Holden et al. | 340/747 |
| 4,710,876 | 12/1987 | Cline et al. | 340/747 |
| 4,805,013 | 2/1989 | Dei et al. | 358/80 |
| 4,850,028 | 7/1989 | Kawamura et al. | 382/46 |
| 4,864,520 | 9/1989 | Setoguchi et al. | 340/747 |
| 4,918,541 | 4/1990 | Ishida et al. | 358/467 |
| 4,922,273 | 5/1990 | Yonekawa et al. | 382/56 |
| 4,928,250 | 5/1990 | Greenberg et al. | 340/747 |

FOREIGN PATENT DOCUMENTS 59-099571 6/1984 Japan ................. G06F 15/20

*Primary Examiner*—Jose L. Couso
*Attorney, Agent, or Firm*—Fitzpatrick, Cella, Harper & Scinto

[57] ABSTRACT

A figure processing apparatus includes a pointing device or keyboard for extracting an outline figure from image data, a memory for storing the outline figure as shape and position data of a primitive figure and displacement data from the primitive figure, and a figure operation device for changing the displacement data to modify the outline figure to create a new outline figure.

32 Claims, 30 Drawing Sheets

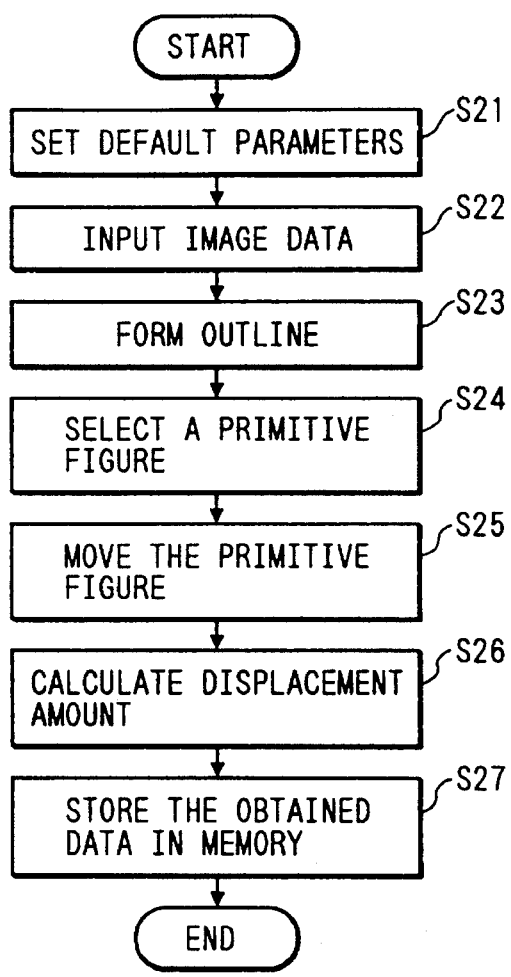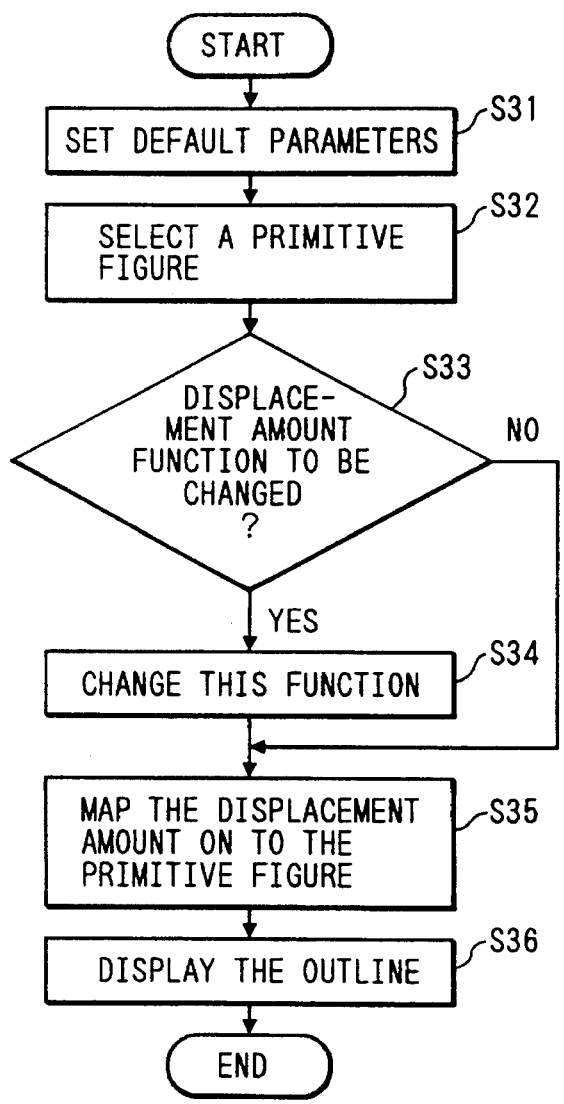

FIG. 45B
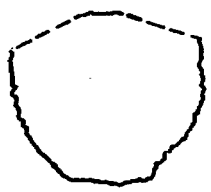
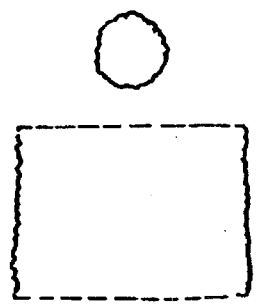

FIG. 45C
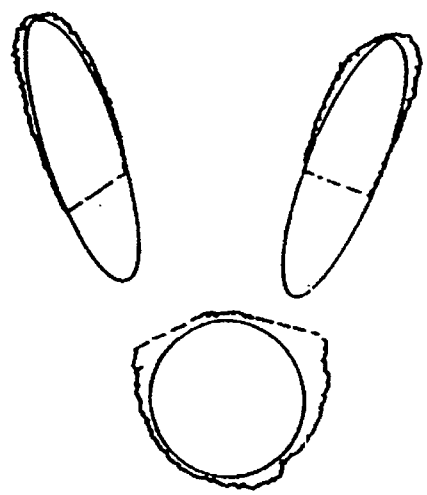
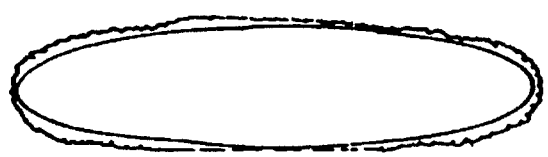
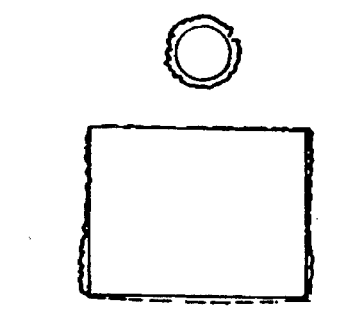
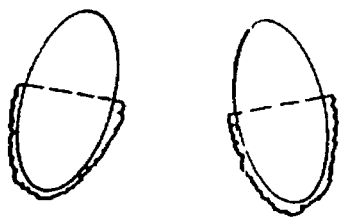

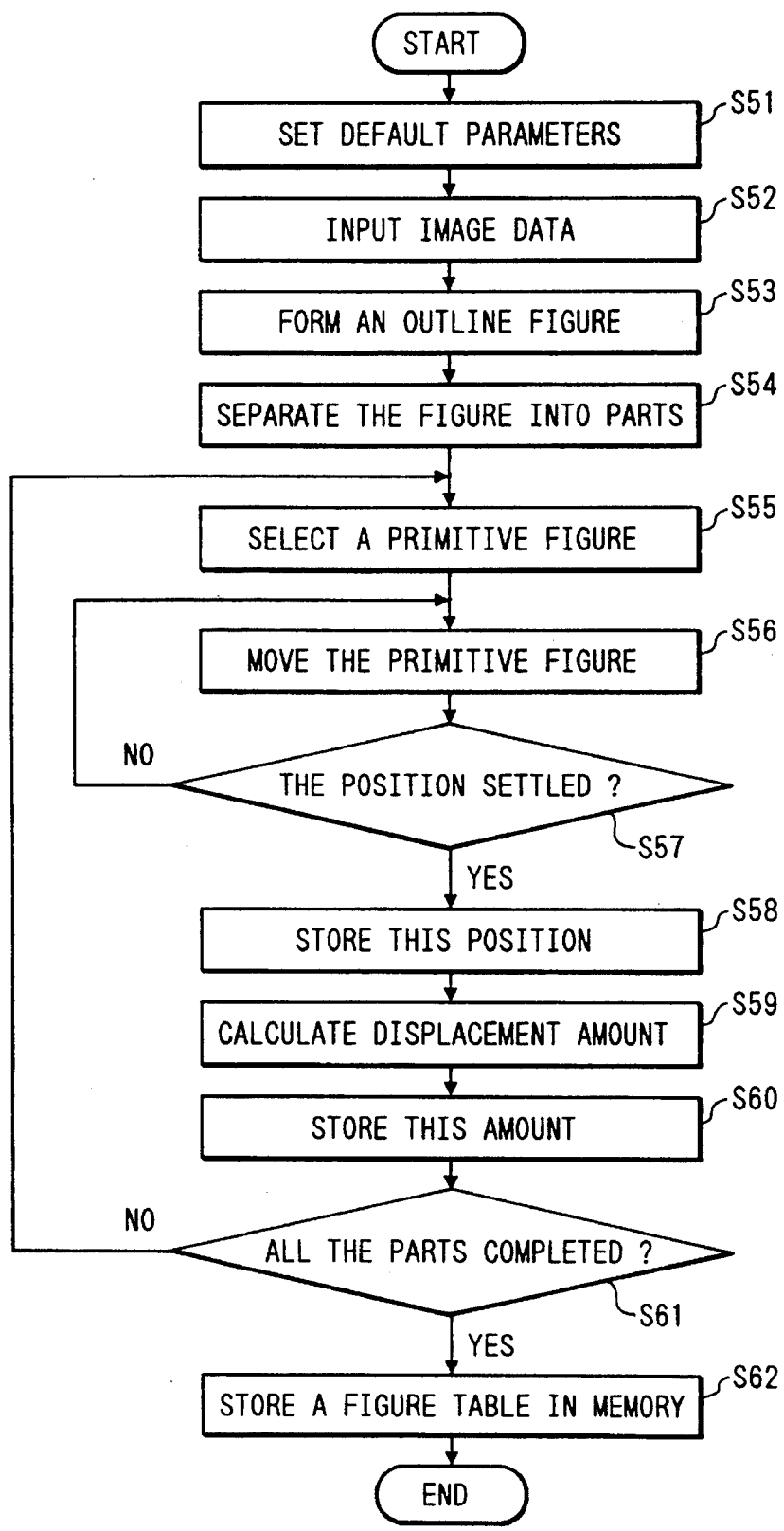

FIGURE PROCESSING APPARATUS

This application is a continuation of application Ser. No. 08/137,812 filed Oct. 19, 1993, now abandoned, which is a continuation of application Ser. No. 07/911,786 filed Jul. 10, 1992 abandoned, which is a continuation of application Ser. No. 07/476,619 filed Feb. 7, 1990, abandoned.

BACKGROUND OF THE INVENTION:

1. Field of the Invention

The present invention relates to figure recognition processing and, more particularly, to processing for recognizing a two-dimensional (planar) figure.

2. Related Background Art

A conventional electro-publishing (electronic publishing) apparatus and a conventional desk-top publishing (portable electronic publishing) apparatus employs the following method of generating figures such as cuts and illustrations. Data of basic figures (to be referred to as primitive figures) such as rectangles and circles are prepared, and these primitive figures are combined to generate a new figure as needed. According to another conventional method of this type, points on an outline or edge to be created are designated as control points, and lines which pass through the control points are connected by using straight lines, curves, and parabolas.

According to these conventional methods, the outlines of the primitive figures are used as basic shapes, and these basic shapes are combined to obtain a desired figure. In practice, satisfactory figures can be created as far as these methods are applied to simple maps, simple block diagrams, and simple wiring diagrams.

Figures such as those of animation characters and abstract objects (e.g., animals, men, and vehicles) may often be impressive when they are expressed by shapes different from those of the primitive outlines. In this case, graphic expressions obtained by only the conventional primitive-figures are unsatisfactory.

When a new figure is created by connecting only control points, the number of points is increased and the drawing procedures are complicated, resulting in inconvenience.

There has never been proposed a method using outlines of natural pictures and objects for new illustrations.

Strong demand has also arisen for utilizing already existing image and object shapes so as to omit operations for creating new figures. For example, an existing shape is used after being modified to a "cylindrical" shape or a "barrel" shape. These demands cannot be sufficiently satisfied, and input operations must be started from the beginning to obtain a desired new shape.

SUMMARY OF THE INVENTION

The present invention has been made in consideration of the conventional drawbacks described above, and has as its object to provide a figure processing apparatus for inputting an image from a scanner or camera, extracting an outline of an object from the image, and recognizing an extracted outline figure as shape modification data for obtaining a new figure.

It is another object of the present invention to provide a figure processing apparatus for extracting an outline figure from image information, and recognizing the outline figure as shape information and position information of a primitive figure as well as displacement information representing a displacement from the primitive figure.

It is still another object of the present invention to provide a figure processing apparatus for changing the displacement information and creating a new outline to modify the outline figure.

It is still another object of the present invention, in consideration of the conventional drawbacks described above, to provide a figure processing apparatus for storing primitive figure shape information, creating displacement information representing a displacement from a primitive figure, and adding the shape information and the displacement information of the primitive figure as shape information of a two-dimensional figure.

It is still another object of the present invention to provide a figure processing apparatus wherein the displacement information is stored in the form of a displacement position, a displacement range, and a maximum or minimum displacement amount.

It is still another object of the present invention to provide a figure processing apparatus for obtaining the displacement information from a displacement from a primitive figure of an outline figure extracted from image information.

It is still another object of the present invention to provide a figure processing apparatus for obtaining a new shape by mapping (pasting) the outline shape information of a plurality of preformed primitive figures with displacement amounts from a reference point of the shape in a reference direction.

The present invention has been made in consideration of the conventional drawbacks described above, and has as its still another object to provide a method of forming a two-dimensional (planar) figure, wherein various shapes can be formed on a primitive figure, and a shape pattern realized on a primitive figure can be utilized for another primitive figure, thereby easily forming another outline shape.

The present invention has been made in consideration of the conventional problems described above, and has as its still another object to provide a figure processing apparatus for processing a two-dimensional (planar) figure, wherein various shapes can be formed on a primitive figure, and a shape pattern realized on a primitive figure can be utilized for another primitive figure, thereby easily forming another outline shape.

It is still another object of the present invention to provide a figure processing apparatus for easily utilizing processing for primitive figures (e.g., the lengths of long and short sides of a rectangle and the major and minor axes of an ellipse) having different sizes and different types (e.g., an ellipse, a rectangle, and a triangle) of primitive figures.

It is still another object of the present invention to provide a figure processing apparatus wherein an entire image of a desired finished figure can be assumed based on primitive figures, and local modifications and shape correction can be interrogatively performed on the primitive figures, thereby easily forming a complicated shape.

It is still another object of the present invention to provide a figure processing apparatus capable of defining as parts any shapes obtained by mapping displacement amounts on outlines of primitive figures, connecting and arranging these parts to perform editing, and interrogating to form a complicated shape.

It is still another object of the present invention to provide a figure processing apparatus capable of normalizing and storing displacement information obtained as a displacement from a primitive figure, and changing the size of the normalized displacement information into a desired size to map the size-changed displacement information with the primitive figure, thereby obtaining outline information of the figure.

It is still another object of the present invention to provide a figure processing apparatus for separating a figure into a plurality of partial shapes and defining the separated partial shapes by the primitive figures, their positions and displacement information therefrom.

According to the present invention, the plurality of partial shapes represented by the primitive figures and the displacement information representing displacements from the primitive figures are edited and arranged to obtain a desired figure.

Editing for obtaining a desired figure from the partial shapes is performed by using only the primitive figures. After the entire arrangement of the partial shapes is determined, displacement information is added to create a new figure.

BRIEF DESCRIPTION OF THE DRAWINGS

FIG. 27 is a flow chart for explaining an operation of the figure generating apparatus of the second embodiment;

FIG. 28 is a flow chart for explaining another operation of the figure generating apparatus of the second embodiment;

FIG. 45B is a view showing a state wherein the figure of FIG. 25A is separated into simple portions;

FIG. 45C is a view showing a state wherein the respective parts of FIG. 45B are matched with primitive figures;

FIG. 51 is a flow chart showing procedures for generating shape parts.

DETAILED DESCRIPTION OF THE PREFERRED EMBODIMENTS [First Embodiment]

Description of Principles

The principles of an embodiment of the present invention will be described in detail. In this embodiment, displacement amount data shown in FIG. 2 or 5 is added to a corresponding position of an existing outline (to be referred to as a primitive figure hereinafter) such as a circle (FIG. 1) or a rectangle (FIG. 4), and a shape outline of a new figure is obtained as a sum of the existing outline and the displacement amount data.

(First Example)

Figure 1:
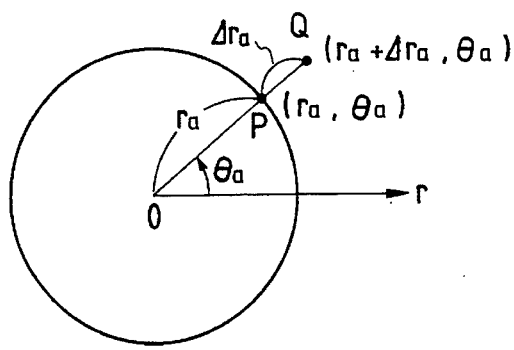
FIG. 1 is a view showing a shape as a first primitive shape for explaining the principle of the first embodiment.
Figure 2:
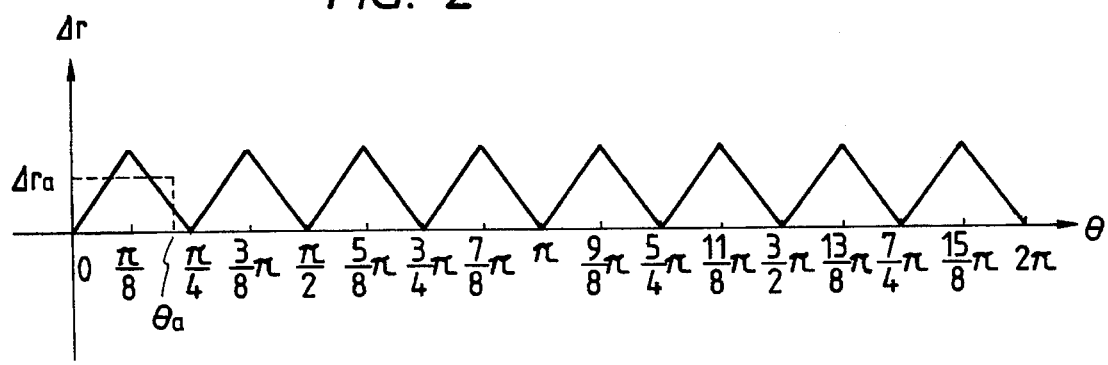
FIG. 2 is a view showing first displacement amount data for explaining the principle of the first embodiment.
Figure 3:
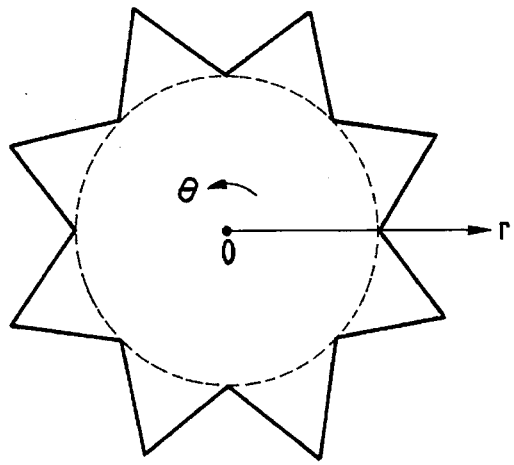
FIG. 3 is a view obtained by FIGS. 1 and 2.

FIG. 1 is a view showing a circle having a radius $r_a$. Assume a point $P(r_a, \theta_a)$ having an angular interval of $\theta_a$ from the reference (r-axis of FIG. 1) on the polar coordinate system. In a graph of FIG. 2, displacement amounts from the reference position are plotted along the ordinate, and outline positions of a primitive figure to be mapped are plotted along the abscissa. Each point on the circumference can be expressed with an angle within the range of 0 to $2\pi$ formed between a horizontal line and a line obtained by connecting each point and the center of the circle. FIG. 3 shows a synthesized outline when a relationship between the displacement amounts and the outline positions of the primitive figure defined in FIG. 2 is given such that the range (i.e., 0 to $2\pi$) of points on the circumference corresponds to the abscissa and the displacements (a direction from the center of the circle to the circumference is defined as a positive direction) toward the normal direction from each point on the circumference corresponds to the ordinate.

According to this relationship, if a displacement amount corresponding to the angle $\theta_a$ is defined as $\Delta r_a$, the point $P(r_a,\theta_a)$ on the outline of the primitive figure corresponds to a synthesized point $Q(r_a+\Delta r_a,\theta_a)$, as shown in FIG. 1. In the example of FIG. 2, the displacement values are given as "1" for $(2n+1)\pi/8$ (n =0, 1, 2, ... 7), "0" for $2n\pi/8$ (n=0, 1, 2, ... 8), and values obtained by sequentially connecting points of $m\pi/8$ (m=0, 1, 2, ... 16) for other outline positions of the primitive figure.

(Second Example)

Figure 4:
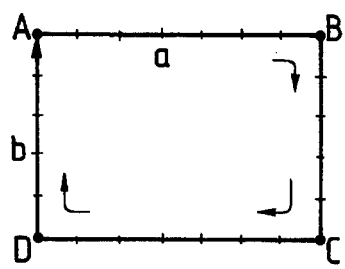
FIG. 4 is a view showing a shape as a second primitive shape for explaining the principle of the first embodiment.
Figure 5:
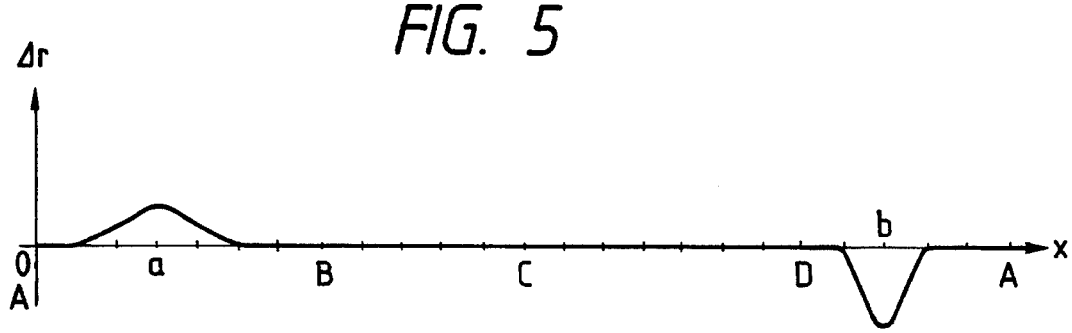
FIG. 5 is a view showing second displacement amount data for explaining the principle of the first embodiment.
Figure 6:
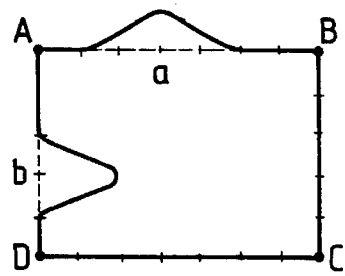
FIG. 6 is a view obtained by FIGS. 4 and 5 according to the first embodiment.

FIG. 4 shows a rectangle having a long side length of "7" and a short side length of "5". FIG. 5 is a graph showing displacement amounts of points on the respective sides with respect to the entire outline of the rectangle shown in FIG. 4. When positions on the four sides of the rectangle shown in FIG. 4 are used as reference positions, and a direction from the inside the rectangle toward the outside in the normal direction of each position on any side of the rectangle is defined as a positive direction, a given position is synthesized with a displacement amount (to be also referred to as pasting or mapping) shown in FIG. 5 to obtain an outline shape shown in FIG. 6. The example shown in FIGS. 4 to 6 is shown on the orthogonal coordinate system.

In the example of FIG. 5, displacement amount data $\Delta r(x)$ at a position x on the outline of the primitive figure is defined as follows:

$$\Delta r(x)=\Delta r_0 \times EXP[-((x-x_0)/\sigma)^2] \qquad \ldots (1)$$

That is, the position $x_0$ on the outline of the primitive figure is given as the center, and a displacement amount distribution as a Gaussian distribution having a maximum displacement amount $\Delta r_a$ is defined. Positions having a displacement amount of $\Delta r_a \times 1/e$ (where e is the base of the Napierian logarithm) are positions ($x_0+\sigma$ and $x_0-\sigma$) on the outline of the primitive figure, i.e., positions away by a distance $\sigma$ from the position $x_0$. If the displacement amount $\Delta r_a$ is negative, a recessed Gaussian distribution can be realized. Referring to FIG. 6, a projecting Gaussian distribution of $\Delta r_a=1$ and $\sigma=2$ is present at the point a, and a recessed Gaussian distribution of $\Delta r_a=-2$ and $\sigma=1$ is present at the point b.

(Third Example)

Data (FIGS. 2 and 5) of a displacement amount for a corresponding position on the original outline need not be caused to correspond to only the outline of a single primitive figure (FIG. 1 for FIG. 2, and FIG. 5 for FIG. 4). That is, displacement data shown in FIG. 8 may be mapped on outlines of different types of primitive figures, as shown in FIG. 7 and 9.

Figure 7:
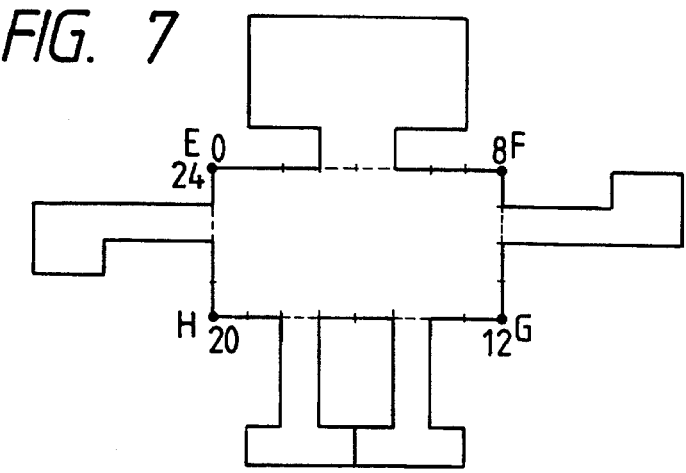
FIG. 7 is a view showing a first shape obtained by the first embodiment as displacement amount data of FIG. 8.
Figure 8:
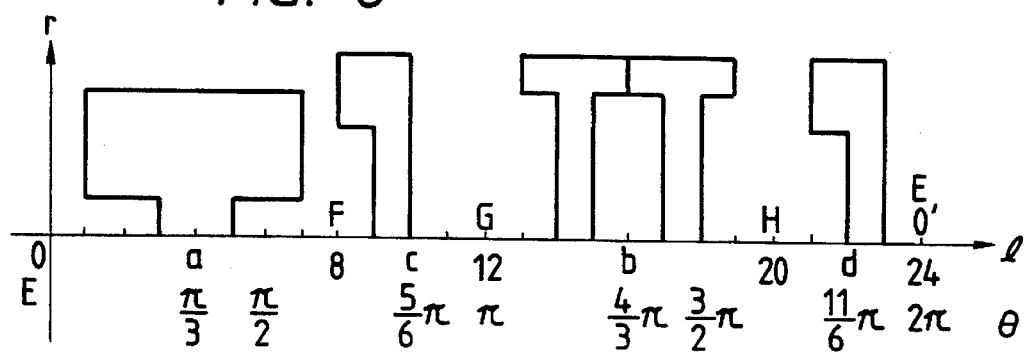
FIG. 8 is a view showing the displacement amount data used to obtain the first shape of FIG. 7 and a second shape of FIG. 9 according to the first embodiment.

FIG. 7 shows mapping of displacement data defined in FIG. 8 on the four sides (length: 24) of a rectangle having a long side length of "8" and a short side length of "4". The origin on the abscissa of FIG. 8 is caused to correspond to the position of a point E in FIG. 7; the position of "8" on the abscissa, to a point F; "12" to a point G; "20" to a point H; and "22" the point E again.

Figure 9:
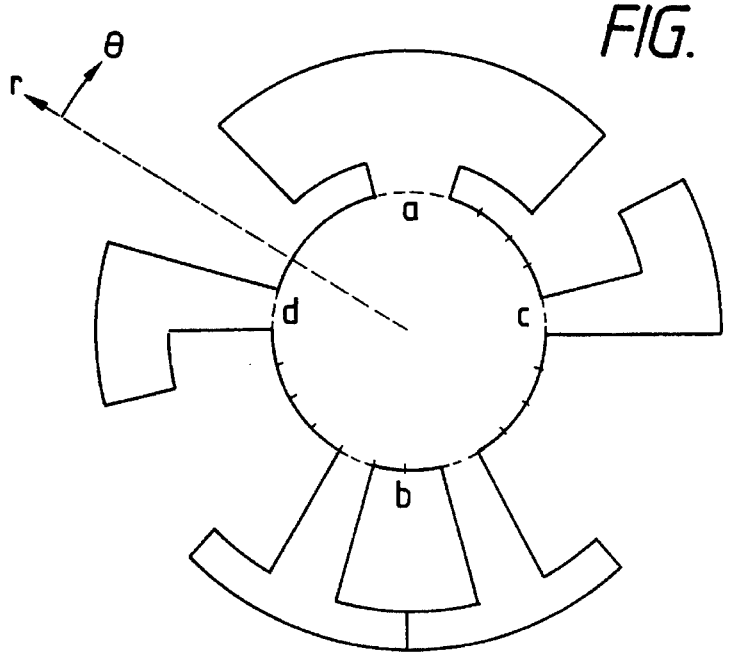
FIG. 9 is a view showing the second shape obtained as the displacement amount data of FIG. 8 according to the first embodiment.

As shown in FIG. 9, with reference to a radius of rotation in the r direction, a point on the circumference at zero angle (in this case, a clockwise angle is a positive angle) is caused to correspond to the origin of the abscissa of FIG. 8; a point a, to "$\pi/3$"; a point c, to "5 $\pi/6$", a point b, to "4 $\pi/3$", and a point d, to "$11\pi/6$". In this case, a direction of displacement from the inside the circle to its outside at circumferential points in the normal direction is a positive direction.

As will be described in detail with reference to the second embodiment, a natural image may be input by a scanner or the like, and an outline (outline of a building or equipment) in an input original image, an appropriate size, and an interval distance between primitive figures may be used to define displacement amount data.

(Arrangement of Figure Generating Apparatus of This Embodiment)

Figure 10:
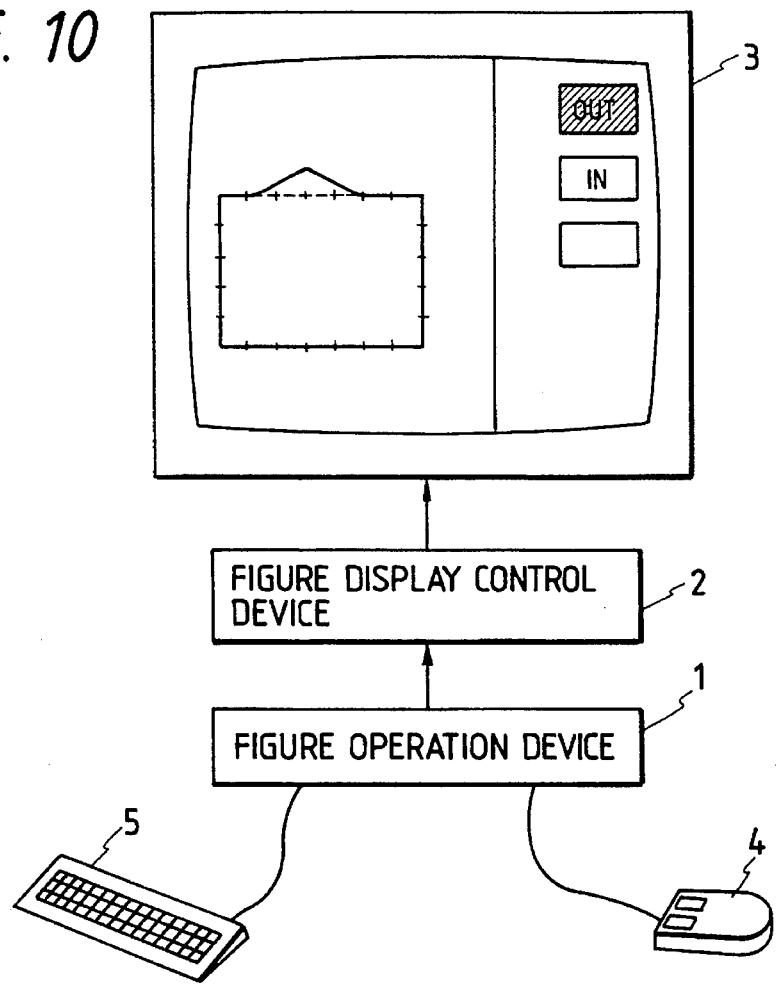
FIG. 10 is a view showing an arrangement of a figure generating apparatus for practicing the first embodiment.

A method of generating a figure described above can be realized by a figure generating apparatus having an arrangement shown in FIG. 10.

Referring to FIG. 10, a figure operation device 1 comprises a computer. A primitive figure and shape position information defined by equation (1) are converted into video signals by a figure display control device 2. The video signals are then displayed on a display device 3 as a CRT display device. The figure operation device 1 designates a primitive figure serving as the base of outline shape formation and causes a pointing device (P.D.) 4 and a keyboard 5 to input parameters necessary for displacement amount operations of equation (1) in accordance with a display of the display device 3.

Figure 12:
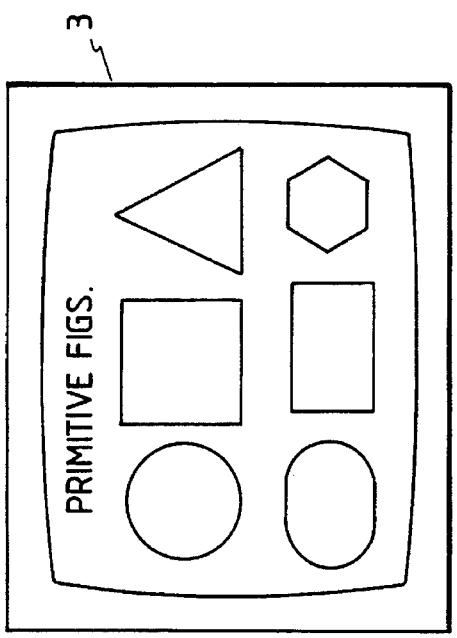

For example, as shown in FIG. 12, the primitive figure serving as the base of figure generation is selected such that a prepared primitive figure list is displayed on the display device 3, a cursor on the screen is moved by using the P.D.

4, and a button of the P.D. 4 is depressed at a desired primitive figure.

A list of modification operations (e.g., pulling, recessing, bending, and expanding) prepared as shown in FIG. 10 is displayed on the display device 3, and a desired modification operation is selected with the P.D 4 in the same manner as in selection of the primitive figure.

Figure 11:
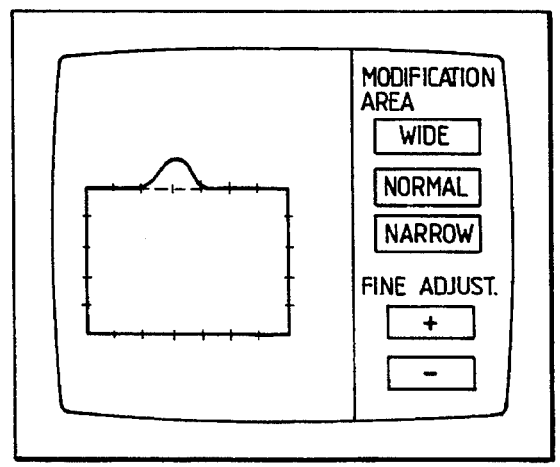
FIGS. 11 and 12 are views for explaining operations of the first embodiment.

As shown in FIG. 11, the displacement amount represented by equation (1) is designated by inputting values for setting a modification area on the display device 3. In the display method of FIG. 11, the right portion of the screen is used as an operation area for setting various values, and the remaining area is used as an area for displaying set values. Values in equation (1) are selected by, e.g., "wide", "normal", and "narrow" values $a_w$, $a_0$, and $a_n$ to define rough values. These rough values are finely adjusted to perform fine correction.

As shown in FIG. 10 or 11, the position of the center of modification is designated as follows. A primitive figure displayed in the figure display area is shifted by a cursor with the P.D. 4 on the screen, and the button of the P.D. 4 is depressed at a desired position. In this case, the depressed position serves as the center of the displacement amount distribution. When the P.D. 4 is moved while its button is kept depressed, a maximum value $\Delta r_a$ of the displacement amount can be determined in accordance with a movement amount of the P.D. 4.

Figure 13:
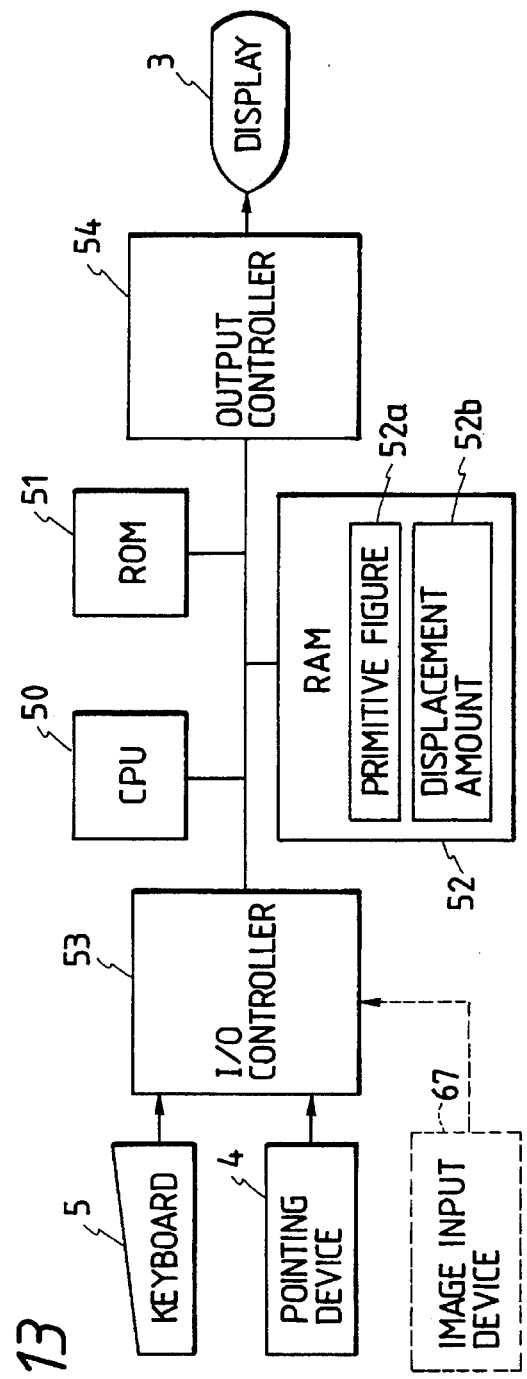
FIG. 13 is a block diagram of a figure generating apparatus for practicing the first embodiment.

FIG. 13 shows a hardware arrangement of an apparatus for realizing the figure generating method of this embodiment. A display device 3, a P.D. 4, and a keyboard 5 are the same as those shown in FIG. 10.

The apparatus includes a CPU 50 for performing arithmetic operations and control in accordance with programs, a ROM 51 for storing programs, a RAM 52 having a primitive figure storage section 52a for storing primitive figures and a displacement amount storage section 52b for storing displacement amounts, an I/O controller 53 for controlling inputs from the P.D. 4 and the keyboard 5, and an output controller 54 for controlling outputs to the display device 3.

The modification operations are performed by the CPU 50 in accordance with flow charts (FIGS. 14A and 14B) corresponding to the programs stored in the ROM 51.

In step S1, of all values used in this step, the CPU 50 sets values which are not specified by an operator. At the same time, the CPU 50 initializes a memory and pointers to be used.

In step S2, as shown in FIG. 12, the primitive shapes prestored in the primitive figure storage section 52a are displayed on the display device 3. The operator selects a desired primitive figure with the P.D. 4. In step S3, as shown in FIG. 10, the types of modification operations prepared in the displacement amount storage section 52b are displayed on the display device 3. The operator selects a desired type of modification operation with the P.D. 4. The CPU 50 determines in step S4 whether the operation selected in step S3 modifies the entire primitive figure or part of the outline shape of the primitive figure. When the primitive figure itself is modified (e.g., bending such as a change from a rectangle to a saddle-like shape, and expanding such as a change from a horizontally extending rectangle to a vertical extending rectangle), associate routines are performed in step S11. The flow advances to step S7 to display a processed figure.

However, when a pulling or recessing operation is designated, the flow advances to step S5. As shown in FIG. 11, a size of the modification area is designated with the P.D. 4.

In step S6, a position of the center of modification and a modification amount are designated with the P.D. 4 by using the shape data displayed on the left side of the display screen of FIG. 11. In step S7, synthesized outline figure data is calculated from the types of primitive figure and modification operation, the modification position on the outline of the primitive figure, and displacement amount information. In step S8, figure data modified in step S7 is displayed on the display device 3 through the output controller 54.

In this state, the CPU 50 causes the output controller 54 and the display device 3 to continuously display the modified figure data. The CPU 50 causes the operator to determine in step S9 whether the degree of modification satisfies the operator's request while the CPU 50 allows the operator to observe the display of the display device 3. Thereafter, the CPU 50 advances to step S10 to determine whether an end signal is input after the CPU 50 determines that no further correction is required by the operator. In this case, when a correction signal which represents a further correction operation is input, the flow returns to step S2, and the CPU 50 is ready for receiving new parameters. In this case, the operator resets new parameters in steps S2 to S6 to perform the operations by the modification equation in steps S7 and S8. The corrected values are displayed on the display device 3. The CPU 50 determines in step S9 whether a modification satisfies the operator's request.

The CPU 50 repeats the loop of steps S2 to S10 until the operator is satisfied with the modification, thereby generating a new figure. When the operator is satisfied with the output result and judges that no further correction is required, he inputs an end signal. Then, the CPU 50 stores the data (the type of primitive figure, the size of the modification area, the position of the center of modification, and the size of modification) in step S12 at positions of the displacement amount storage section 52b designated by a counter of a data memory table and then increments the count of the counter. The CPU 50 determines in step S14 whether next curve data is to be generated on the basis of the decision of the operator. When the next data is to be generated, the flow returns to step S2.

Figure 15:
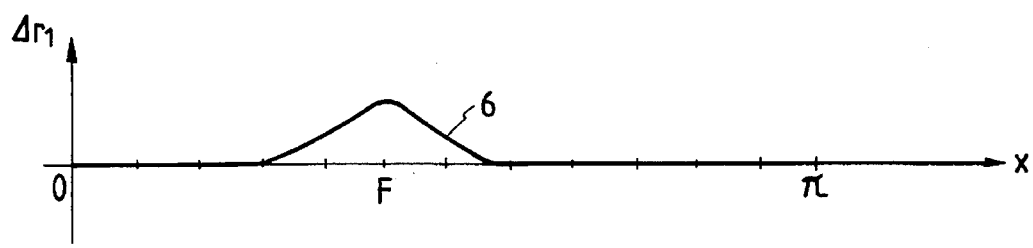
FIGS. 15 to 19 are views for explaining modifications of the first embodiment.
Figure 16:
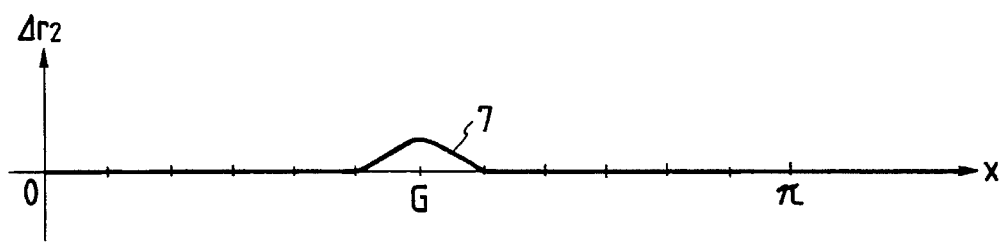
Figure 17:
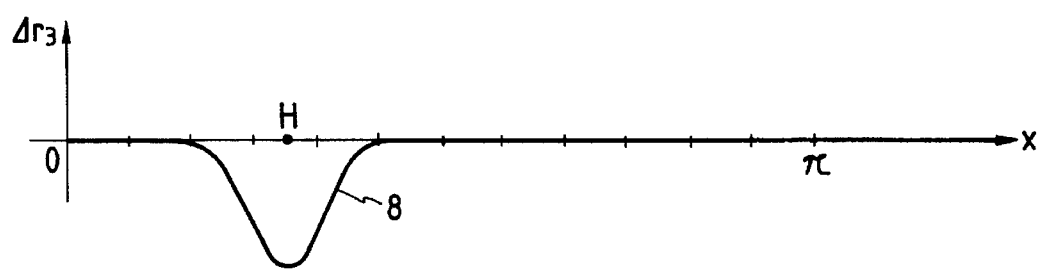
Figure 18:
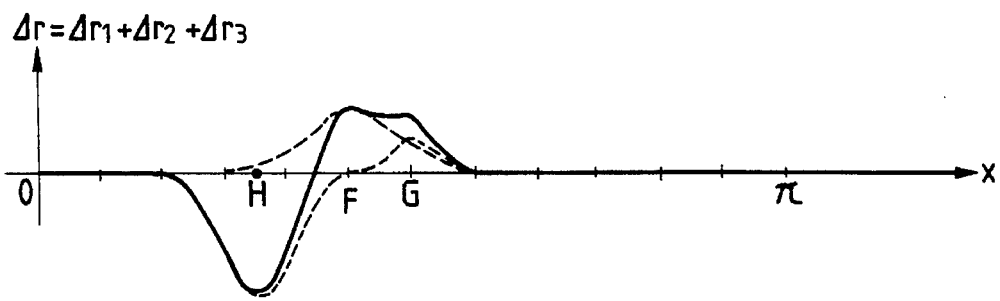
Figure 19:
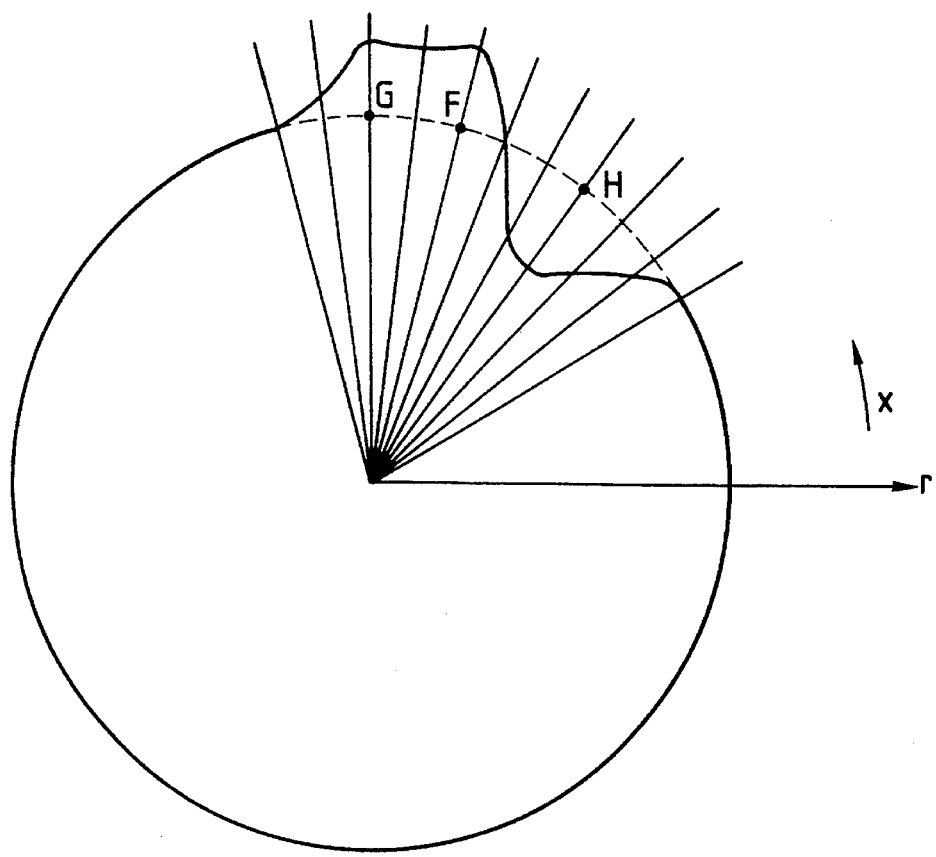

In this embodiment, when the flow returns to step S3 since the CPU 50 determines that correction is required, all the operations in steps S2 to S6 need not always be performed again. The state immediately before return to step S2 may be held to allow additional modification. In this case, a displacement amount is added to the above state and is used as new displacement amount data. This state is shown in FIGS. 15 to 18. Projections 6 and 7 in FIGS. 15 and 16 are formed by pulling operations, and a recess 9 is formed by a recessing operation. The centers of the projections 6 and 7 are set to be points F and G, respectively, and the center of the recess 8 is set to be a point H. If the primitive figure is a circle, the shape to be displayed is as shown in FIG. 19.

Figure 14A:
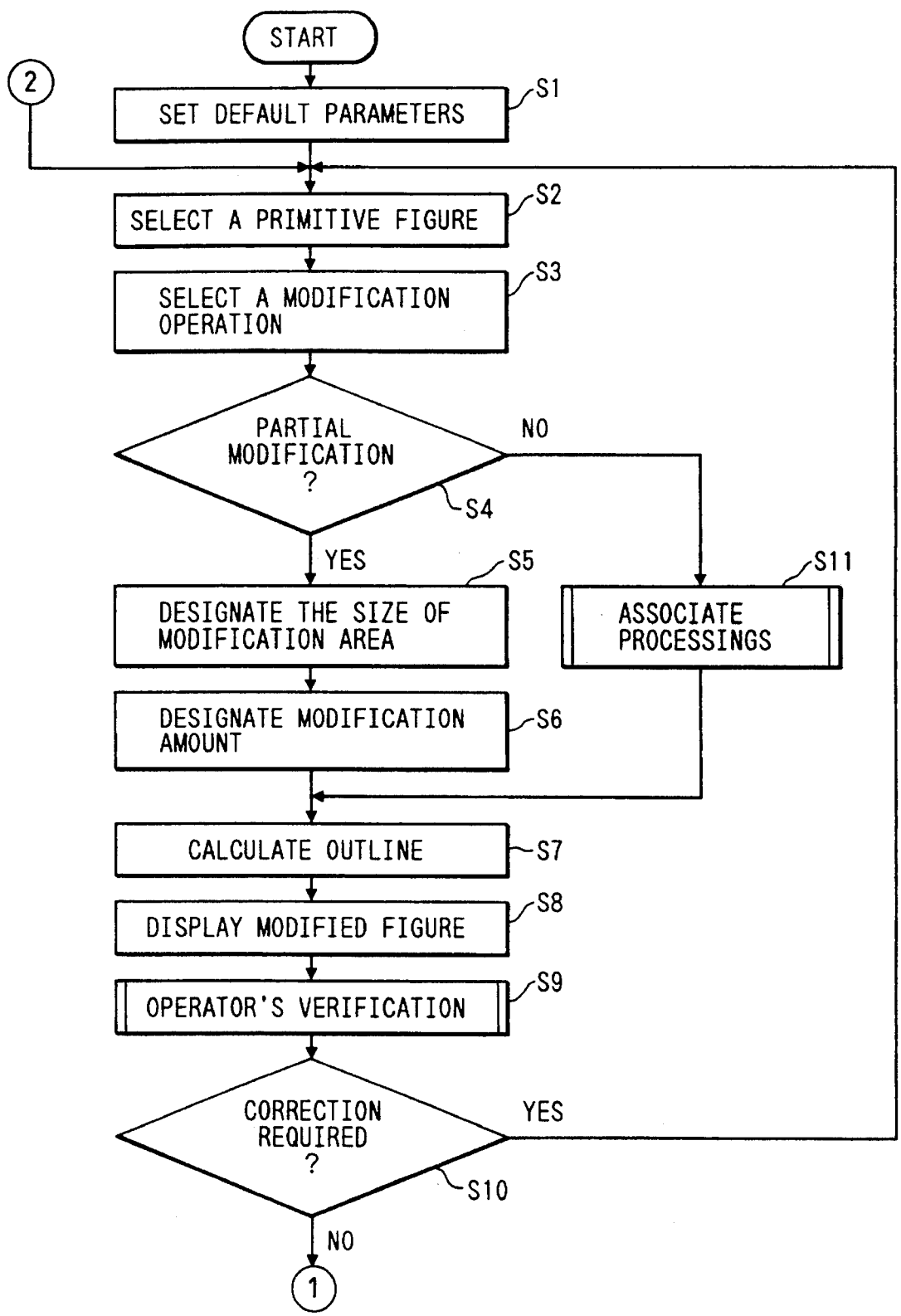
FIGS. 14A and 14B are flow charts for explaining an operation of the figure generating apparatus of the first embodiment.
Figure 14B:
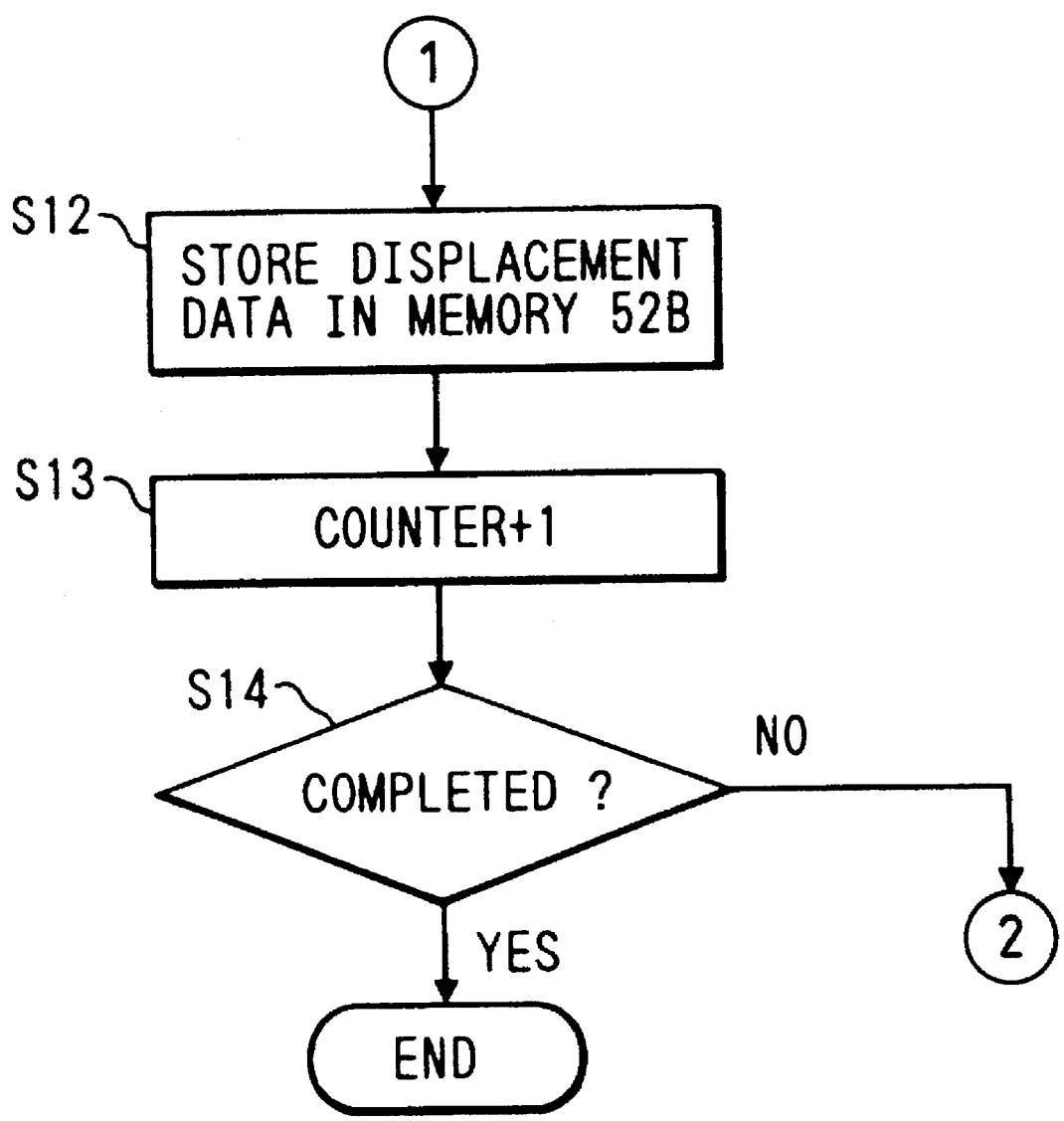

The above operation can be expressed by flow charts of FIGS. 14A and 14B. The values set in steps S2 to S6 in the state immediately before return to step S2 are used without changes. Displacement amounts are sequentially added, and parameters of the respective displacement amount data are stored. In the operation of step S7, a sum of a plurality of displacement amounts is used to express curved surface displacement amounts as display curved surface data as follows:

$\Delta\gamma(x) = \sum_i \Delta\gamma_i(x)$ where $\Delta\gamma(x)$ is a displacement amount at a position x of the outline of the primitive figure, and $\Delta\gamma_i(x)$ is a displacement amount at the position x of the outline of the primitive figure which is obtained by the ith parameter of the plurality of displacement data.

When the parameters are set in step S12, the number of the plurality of displacement data and the parameters of the displacement data are preserved. In this manner, when the displacement amount data is generated by using a plurality of displacement data, a complicated shape can be expressed by simple operations. The operator creates a new figure as if he creates a clay work on the display device 3.

In the above embodiment, displacement amount data is generated by using a Gaussian curve. However, the present invention is not limited to only this.

Figure 20:
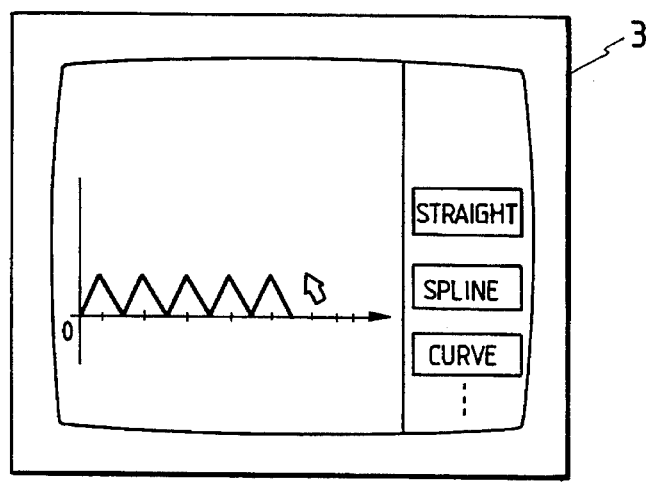
FIG. 20 is a view for explaining another modification of the first embodiment.

As shown in FIG. 20, points are input by using the P.D. 4 as in the conventional method, and the input points are sequentially connected to each other. However, the generated curve does not indicate a final shape unlike the conventional case. This shape serves as a graph showing displacement amounts of the respective points on the outline of the primitive outline. These input displacement amounts are pasted to the primitive figure to obtain a finished shape.

As described above, the preformed primitive figure information and displacement amount curve information consisting of displacement amounts from the reference point and mapped (pasted) with the outline shape of the primitive figure are provided, and displacement amounts are mapped on the outline of the primitive figures to obtain a new shape, thereby providing the following effects.

(1) Unlike the conventional technique in which a shape is created from nothing, a new shape can be created by using primitive figures, so that (i) a shape can be intuitively recognized, and (ii) steps of defining the shape for drawing can be reduced. Thus, operability and interrogation performance are improved.

(2) Displacement amount data used for a primitive figure can be mapped on an outline of another primitive figure (e.g., displacement data mapped on the circumference of a circle is mapped on an ellipse, or displacement data mapped on the sides of a rectangle is mapped on a trapezoid) to easily generate another shape having a similar shape. [Second Embodiment]

(Description of Principles)

The principles of this embodiment will be described below. In the first embodiment, displacement amount curve information consisting of displacement amounts is given by an operation expression (a Gaussian distribution or the like) prestored in a memory or input by an operator. However, in the second embodiment, a primitive figure and displacement information are extracted from any input image to utilize the extracted displacement information as that of the first embodiment.

(Fourth Example)

Figure 21:
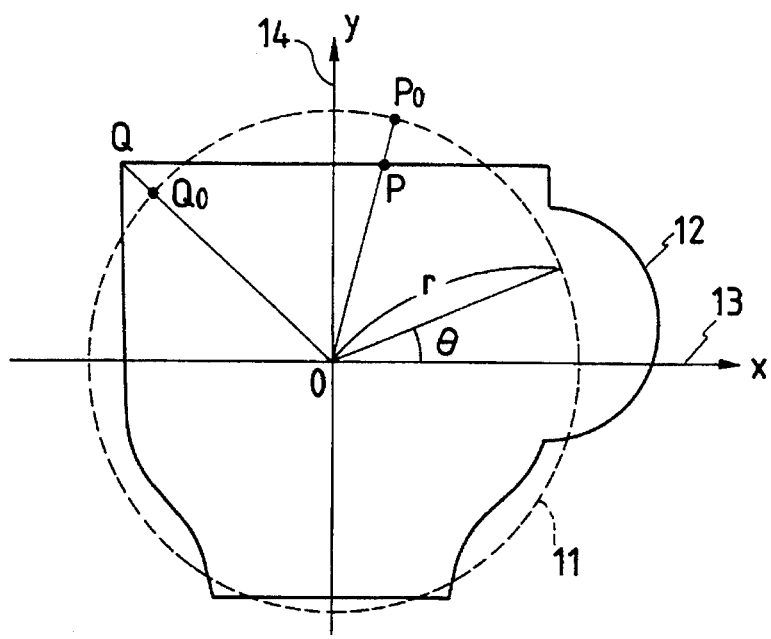
FIG. 21 is a view showing a relationship between a primitive figure and an outline figure for explaining the principle of the second embodiment.

FIG. 21 is a view showing a relationship between a primitive figure and an outline figure. A primitive FIG. 11 in FIG. 21 is a circle having a radius r. The primitive figure is not limited to a circle, but may be any figure such as a square, a rectangle, an ellipse, or a triangle.

An outline FIG. 12 has a line width of "1". FIG. 21 shows an image after outline extraction is completed upon predetermined image processing. The primitive figure is assumed as an array of dots equidistantly spaced apart from an origin O by a distance r. If an angle formed between a segment $P_0O$ on the primitive FIG. 11 and the x-axis is defined as $\theta$, coordinates of a given point $P_0$ are given as $(r\cos\theta, r\sin\theta)$.

Figure 23:
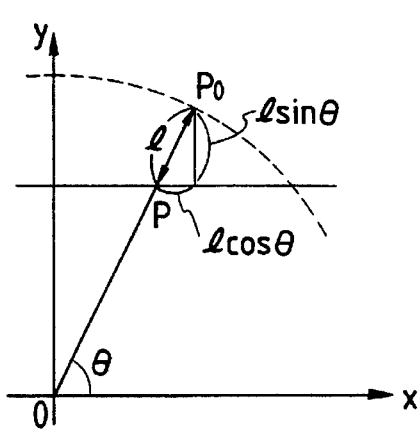
FIG. 23 is a view for further explaining the relationship of FIG. 21.

FIG. 23 is an enlarged view of part of FIG. 21. In this example, the direction of displacement of the outline figure with respect to the primitive figure is a normal direction of the circle. If a given point on the outline figure is located outside the circle, this point has a positive displacement amount. However, if the given point on the outline figure is located inside the circle, this point has a negative displacement amount. However, the definition of the direction of displacement is not limited to the one described above. That is, it is assumed that a point P is negatively displaced with respect to the point $P_0$, and a point Q is positively displaced with respect to a point $Q_0$ in FIG. 21.

A displacement amount of the point P on the outline FIG. 12 with respect to the point $P_0$ is calculated. A distance OP between the point $P(x_p, y_p)$ and the origin 0 is calculated as $$OP = \sqrt{x_p^2 + y_p^2} \ .$$

Since $\overline{OP} = r$ is given, a displacement amount $\Delta r$ of the point P with respect to the point $P_0$ is given as follows:

If $\overline{OP} \geq \overline{OP_0}$, then $$\Delta r = \sqrt{x_p^2 + y_p^2} - r$$

If $\overline{OP} < \overline{OP_0}$, then $$\Delta r = -\sqrt{x_p^2 + y_p^2} - r$$

Figure 22:
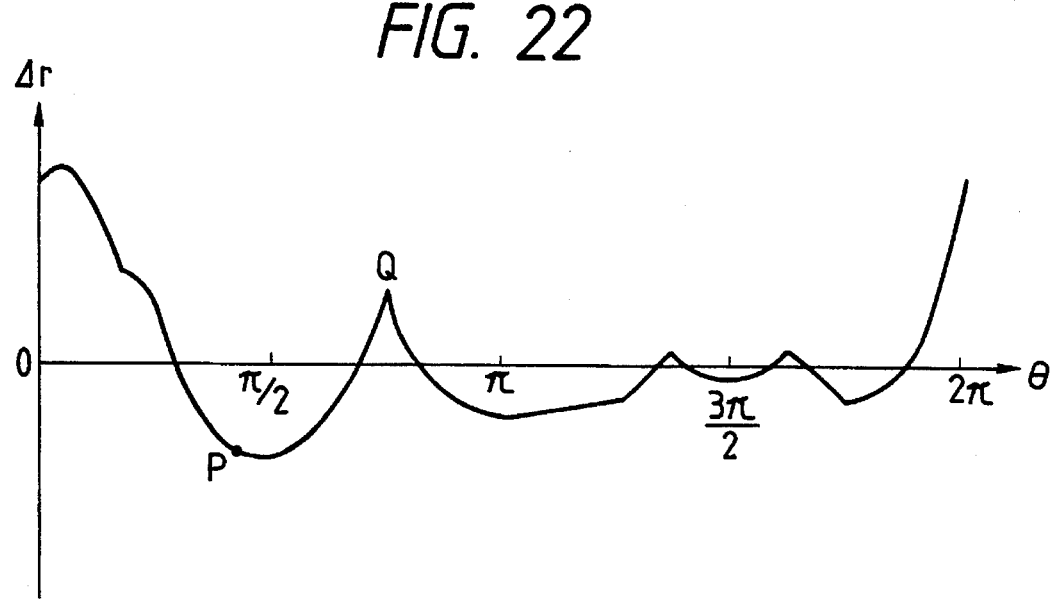
FIG. 22 is a view for explaining displacement amount data so as to explain the principle of the second embodiment.

In this manner, the point P on the outline figure is defined to have a displacement amount $\Delta r$ with respect to the point $P_0$ determined by the angle $\theta$ and located on the primitive figure. When the angle $\theta$ is changed from 0 to $2\pi$, the outline figure is represented as a displacement amount curve, as shown in FIG. 22. In other words, if the primitive figure information (the primitive attribute as a circle and its radius r in this case) and the displacement amount curve are given, the original outline figure can be reproduced.

(Fifth Example)

In the above example, the displacement amount reference is given by a displacement defined in the normal direction of the primitive figure with respect to the point $P(\theta, r)$ on the primitive figure which is represented by the angle $\theta$ and the distance r from the origin O.

The respective points on the sides of a square are represented by distances from a reference point A on the side of the square as the displacement amount reference. A direction from the inside of the square to the outside is positive at each point on a given side in the normal direction. A distance between any point and the corresponding point of the primitive figure is defined as a displacement amount.

Figure 24:
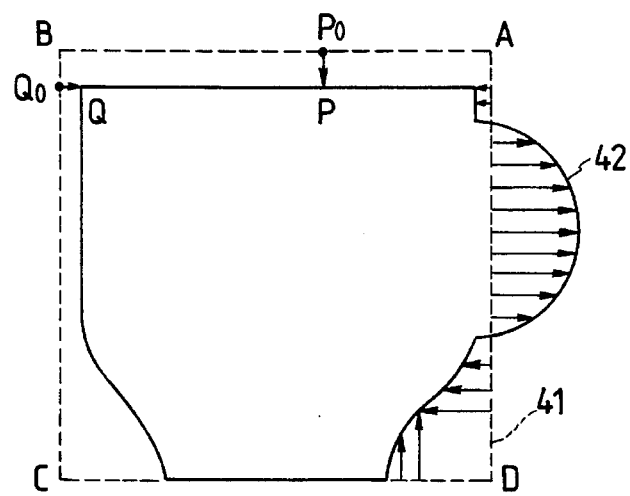
FIG. 24 is a view showing a relationship between a primitive figure and an outline figure.
Figure 42:
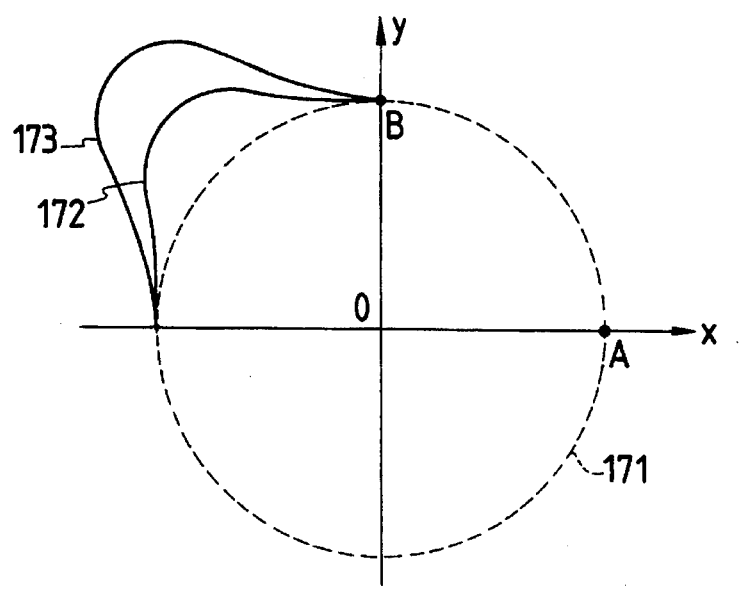

FIG. 24 shows an outline figure defined by displacement amounts from a primitive figure ABCD. A point P on the outline FIG. 42 is taken as an example. The point P can be expressed by displacement amounts from sides AB, BC, CD, and DA. In this case, the smallest displacement amount P is defined as the displacement amount of the point P. Therefore, the point P is defined by a displacement amount $\Delta l$ from a point $P_0$ serving as a reference whose normal passes through the point P on the side AB.

Figure 25:
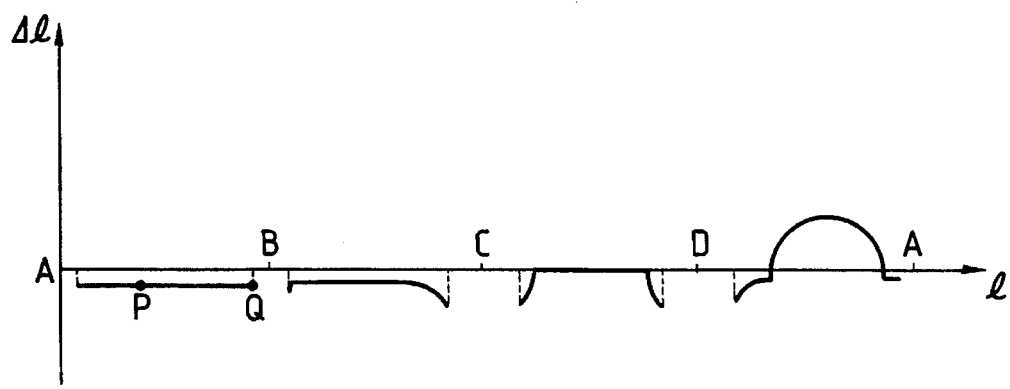
FIG. 25 is a view showing displacement amount data of FIG. 24.

FIG. 25 is a view showing displacement amounts of the respective points on the four sides with respect to the entire outline of the square ABCD. This will be described in detail below. The entire outline length of the square ABCD is given as 24 and a reference point on a given side is given as A. The point A is given as a point spaced part from the point $P_0$ by a distance of 2.3. An intersection between the normal to the point $P_0$ and the outline figure is defined as the point P. Since the direction from the inside of the square ABCD to its outside is defined as a positive direction, the point P is defined as a point having a displacement of −0.5 from the point $P_0$. A point Q can be similarly represented. When a distance l from the point A is changed from "0" to "24", the outline FIG. 42 can be expressed, as shown in FIG. 25.

As described above, the outline figure is obtained as a displacement amount curve consisting of the primitive figure and the displacement amounts from the primitive figure.

(Arrangement of Figure Generating Apparatus of This Embodiment)

Figure 26:
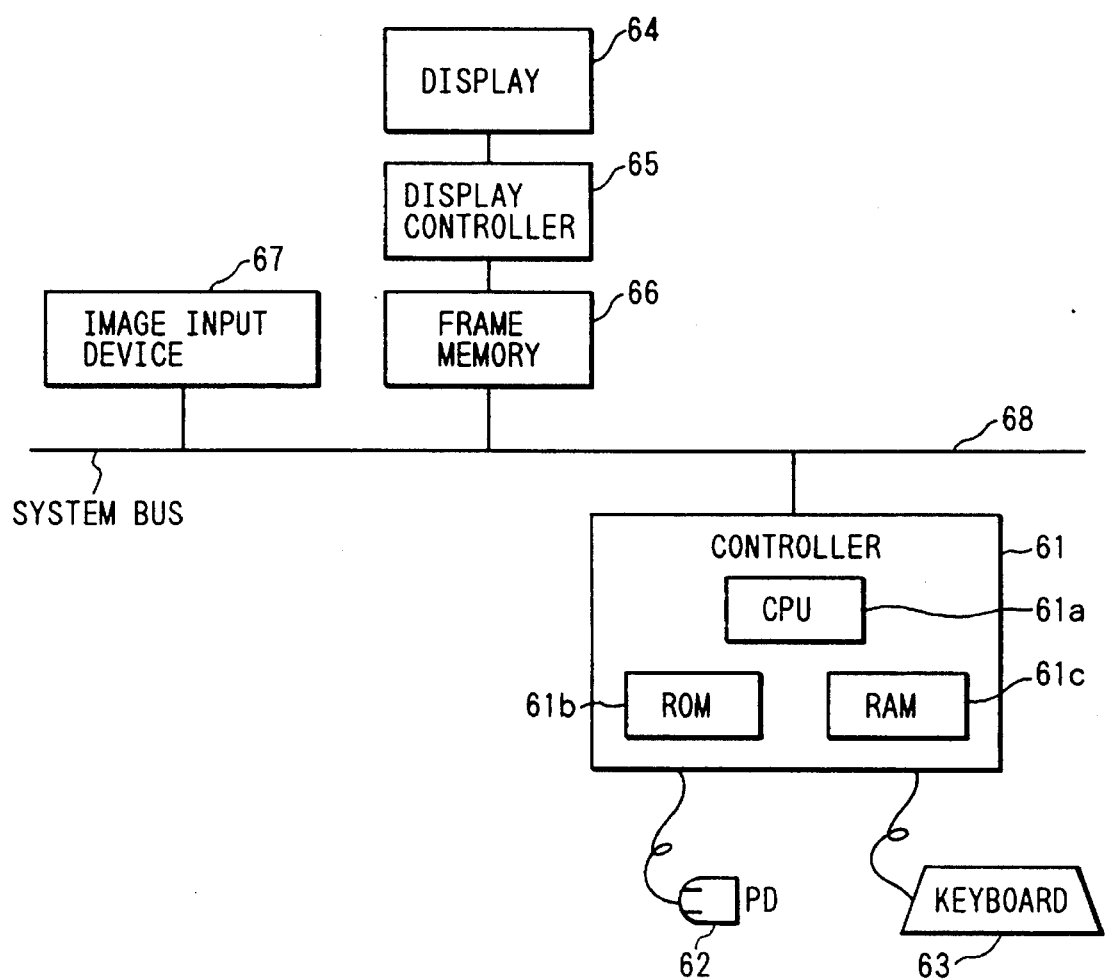
FIG. 26 is a view showing an arrangement of a figure generating apparatus of the second embodiment.

The above figure recognition method can be realized by a figure generating apparatus having an arrangement shown in FIG. 26.

Referring to FIG. 26, a figure operation controller 61 comprises a computer. The figure operation controller 61 performs figure operations, image processing, and the like. An operator can input numeric values and codes with a keyboard 63 or can interrogatively input these numeric values and codes with a P.D. 62 while moving a cursor displayed on a display 64. An image input device 67 comprises, e.g., a scanner or a camera. A digital image received by the image input device 67 is temporarily stored in a frame memory 66 through a system bus 68 and is processed in accordance with programs stored in a ROM 61*b* under the control of a CPU 61*a* in the figure operation controller 61 which uses a RAM 61*c* as an auxiliary storage. Image data stored in the frame memory 66 is converted into an analog signal by a D/A converter or the like in a display controller 65, and the analog signal is displayed on the display 64.

The hardware arrangement of the figure generating apparatus of this embodiment is obtained by adding the image input device 67 to the arrangement of the first embodiment shown in FIG. 13.

An operation of the figure generating apparatus of this embodiment will be described with reference to a flow chart in FIG. 27.

Of various values used in this processing, the CPU 61*a* of the figure operation controller 61 sets values which are not clearly designated by the operator. At the same time, the CPU 61*a* initializes a memory, registers, and pointers.

In step S22, image data (binary, multivalue monochromatic, color data) are stored from the image input device 67 to the frame memory 66 through the bus 68. In step S23, the CPU 61a extracts an outline of the fetched image. Various outline extraction algorithms have been proposed, and two of them are exemplified below.

(1) An edge of an input image is emphasized by a differential operator such as one differential step, and binary processing is performed to reduce the thickness of the edge, thereby extracting an outline.

(2) An edge of an input image is emphasized by a differential operator such as one differential step, binary processing operation is performed, and then outline tracking is performed. Outline tracking is started with search for a start point for outline tracking. Tracking end marks are assigned to points found during tracking, and tracking progresses. When a tracking cycle is ended, one outline is obtained.

Figure 29:
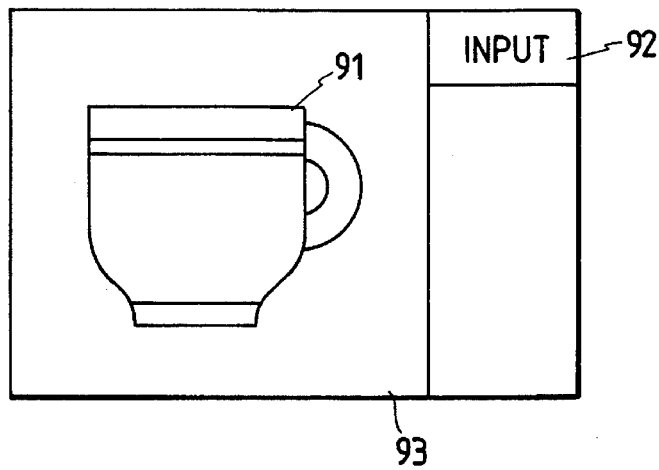
FIGS. 29, 30, and 31 are views showing display contents of a display device of the figure generating apparatus of the second embodiment.

By these outline extraction methods, an outline figure having a line thickness of one pixel can be obtained. If necessary, the P.D. 62 is used to move a cursor to omit unnecessary portions or add desired lines and points. When the operation in step S22 is to be performed, the operator moves the P.D 62 while observing the display 64, thereby moving the cursor to the "input" item in a menu area 92 assigned in a display screen 93 of FIG. 29. When the button of the P.D. 62 is depressed, processing in step S22 is started. In this manner, the operator performs processing interrogatively while observing the display. When the operation in step S22 is completed, an input image 91 is displayed on the display screen 93, as shown in FIG. 29.

Figure 30:
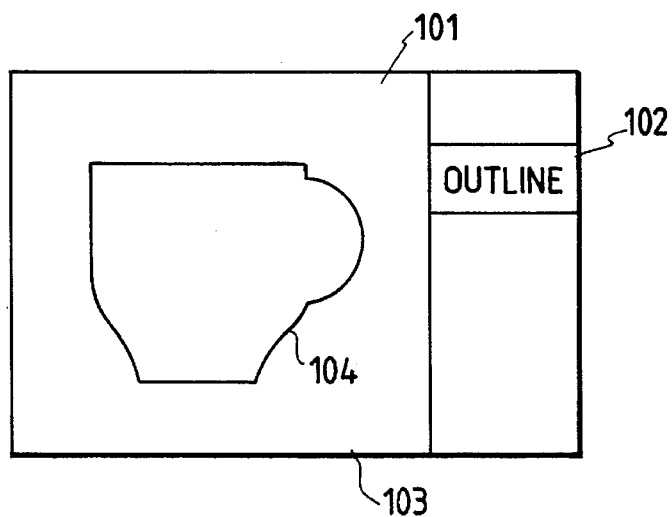

In order to execute the operation in step S23, an outline extraction menu 102 shown in FIG. 30 is selected by using the P.D. 62. The outline extraction processing described above is executed, and an image such as an outline figure 101 is displayed on a display screen 103. This image is stored as pixel value data at a predetermined address of the frame memory 66.

Figure 31:
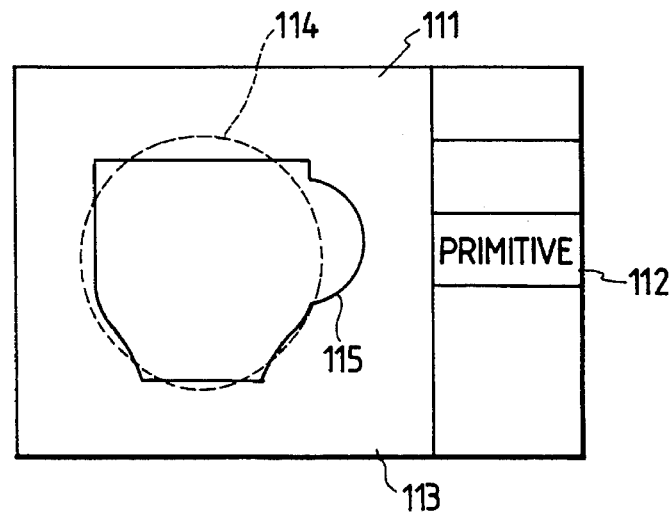

In steps S24 and S25, a primitive figure is selected and moved. Selection and movement of a primitive figure can be performed by designating a type, a size, and a position of a primitive figure by using the P.D. 62 or the keyboard 63. An outline figure 115 and a primitive figure 114 are displayed as on a display screen 111 of FIG. 31.

In step S26, a displacement amount curve shown in FIG. 22 with respect to a primitive figure (a circle in this case) can be obtained by the principle described above. The displacement amount reference is given such that a direction from the inside of the circle to the outside of the circle represented by a radius r and an angle θ formed between the x-axis (horizontal axis) and a line obtained by connecting any point on the circle and the center of the circle in the normal direction is defined as a positive direction. In step S27, primitive figure information (attributes, size, and position of the primitive figure) and the displacement amount curve data are stored in a memory.

In this manner, the outline figure defined as pixel values for two-dimensional addresses in the frame memory can be converted into another data form. When a technique is employed to map the displacement amounts corresponding to the respective points of the primitive figure on the basis of the resultant primitive figure information and the displacement amount information, the original outline figure can be obtained. When the primitive figure information and the displacement amount curve information are obtained, a figure can be modified based on these pieces of information.

Figure modification processing will be described with reference to a flow chart in FIG. 28.

Of all the values used in this processing, the CPU 61*a* of the figure operation controller 61 sets values which are not clearly designated by the operator. At the same time, the CPU 61*a* initializes a memory, registers, and pointers. In the following steps, operations such as numeric value setup, data conversion, and image movement are performed with the P.D. 62 as in the above embodiment.

Figure 32:
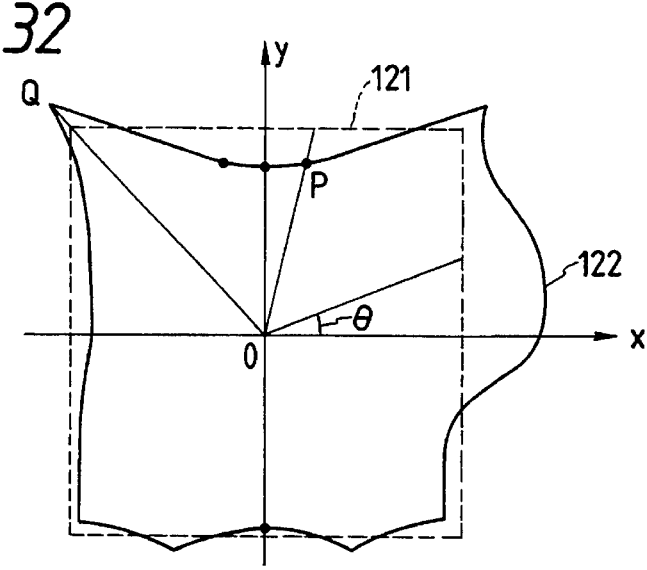
FIGS. 32 and 34 are views showing results obtained by executing the modifications of the second embodiment.

In step S32, a primitive figure to which a displacement amount is mapped is selected. The CPU 61*a* determines in step S32 whether a displacement amount function is modified. If NO in step S33, the flow advances to step S35. In step S35, the displacement amounts are mapped on the primitive figure. For example, when a rectangle represented by P(l,θ) is selected as a primitive figure, a modification is performed to obtain an outline FIG. 122 shown in FIG. 32. Referring to FIG. 32, the primitive figure 121 is a square figure. The outline FIG. 122 is a figure obtained after mapping. In this manner, by changing only the primitive figure, the shape of the outline figure can be easily changed.

Figure 33:
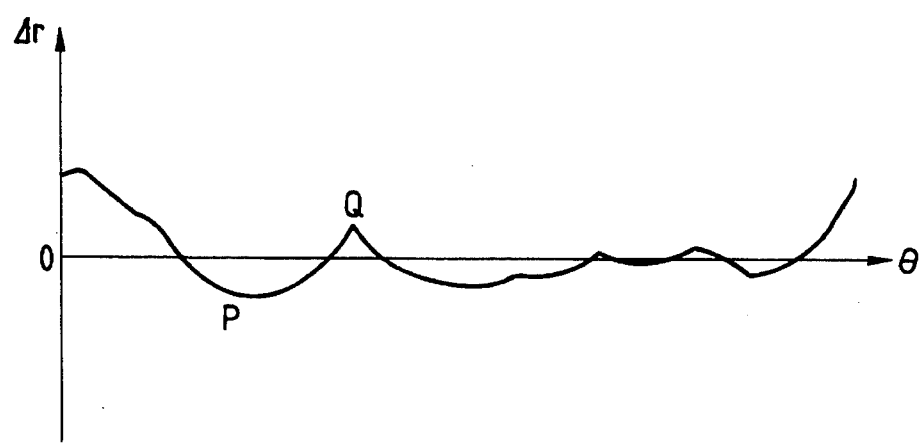
FIG. 33 is a view for explaining displacement amount data of the modifications of the second embodiment.
Figure 34:
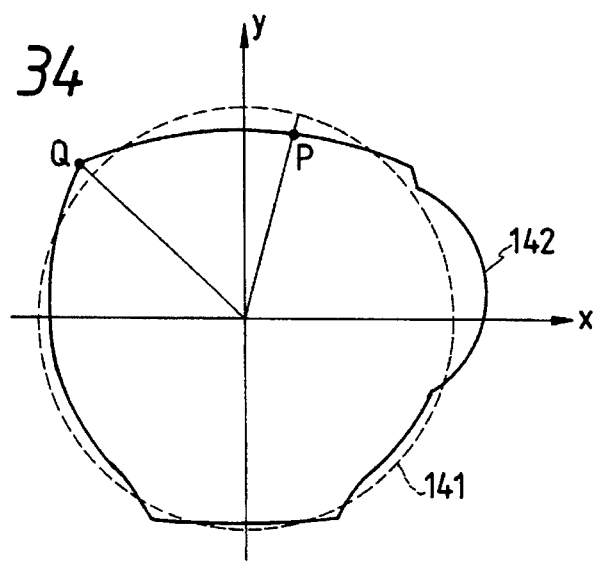

When a change in modification amount curve is changed in step S33, the modification amount curve is changed in step S34. A result obtained by a modification amount of ½ is shown in FIG. 33. Mapping onto a primitive FIG. 141 of FIG. 34 is performed by using the modification amount shown in FIG. 33 to display an outline figure in step S36. In this manner, the outline figure can be easily modified by simply modifying the displacement amount curve.

As described above, since the outline extracted figure is expressed by the prestored primitive figure information and the displacement amount curve information expressed by displacement amounts from the reference point of the primitive figure in the reference direction, the following effects are obtained.

(1) Unlike the conventional technique in which a shape is created from nothing, a new two-dimensional figure can be generated by using outlines of already existing objects and images.

(2) When the resultant outline figure is to be further modified, (i) a shape can be intuitively recognized, and (ii) steps of defining the shape for drawing can be reduced. Thus, operability and interrogation performance are improved.

(3) Displacement amount data used for a primitive figure can be mapped on an outline of another primitive figure to easily generate another shape having a similar shape.

According to this embodiment, there is provided a method of recognizing a figure, wherein an image from a scanner or a camera is input, an outline of an object in an image is extracted, and its outline figure is recognized as shape modification data for generating a new figure.

In addition, (1) The volume of data for expressing an outline figure can be reduced.

(2) An outline figure can be easily modified into a new figure.

(3) A shape such as an actually existing object can be easily used for figure generation.

According to this embodiment, there is provided a method of generating a two-dimensional (planar) figure, wherein various shapes can be generated on a primitive figure, and a shape pattern on a primitive figure can be utilized for another primitive figure to obtain a new outline shape.

As described above, since the outline extracted figure is expressed by the prestored primitive figure information and the displacement amount curve information expressed by displacement amounts from the reference point of the primitive figure in the reference direction, the following effects are obtained.

(1) Unlike the conventional technique in which a shape is created from nothing, a new two-dimensional figure can be generated by using outlines of already existing objects and images.

(2) When the resultant outline figure is to be further modified, (i) a shape can be intuitively recognized, and (ii) steps of defining the shape for drawing can be reduced. Thus, operability and interrogation performance are improved.

(3) Displacement amount data used for a primitive figure can be mapped on an outline of another primitive figure to easily generate another shape having a similar shape.

According to this embodiment, there is provided a method of generating a two-dimensional (planar) figure, wherein various shapes can be generated on a primitive figure, and a shape pattern on a primitive figure can be utilized for another primitive figure to obtain a new outline shape.

[Embodiment for Normalizing Displacement Amount Data]

Figure 35:
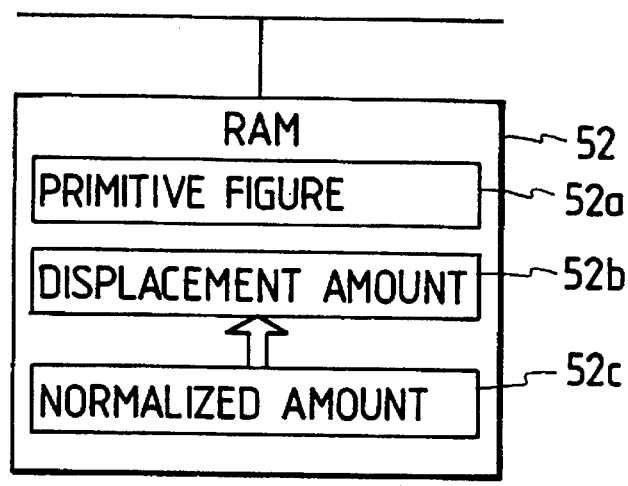
FIG. 35 is a view showing an arrangement for storing normalized displacement amount data.
Figure 36A:
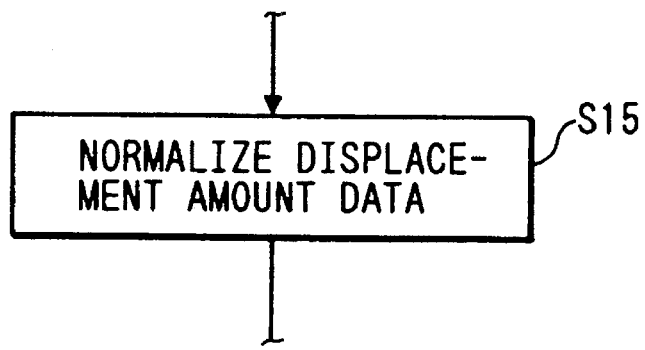
FIG. 36A is a flow chart showing normalization of the displacement amount data.

Still another embodiment of the present invention will be described below. As shown in FIG. 35, when a normalized amount storage section 52c is arranged in the ROM 52 shown in FIG. 13 to store normalized displacement amount data, utilization of the normalized displacement amount data to primitive figures having different sizes and different inference routing procedures, or modifications of mapping positions of the same primitive figure can be facilitated. In this case, before displacement amount data is stored in the RAM 52 in step S12 of FIG. 14B, the displacement amount data are normalized in step S15 in FIG. 36A. In step S12, the normalized displacement amount data are stored in the normalized amount storage section 52c.

Figure 37:
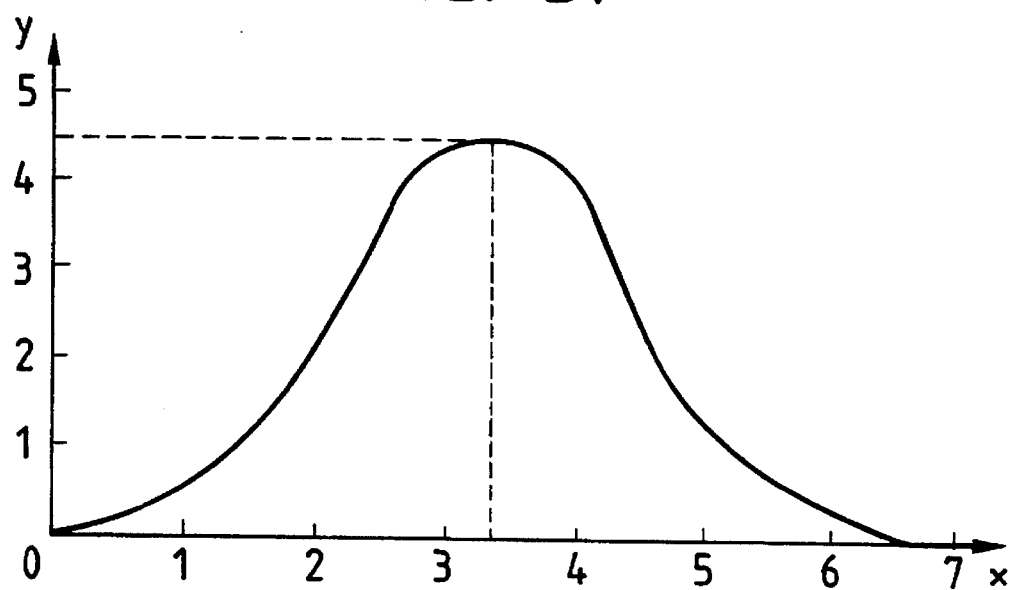
FIG. 37 is a view showing non-normalized displacement amount data.

Assume that displacement amount data of a displacement amount curve $y=f(x)$ ($0 \leq x \leq 7$) shown in FIG. 37 is obtained to map displacement amount data onto a primitive figure. The displacement amounts from the reference position are plotted along the ordinate, and the positions on an outline of a figure to be mapped are plotted along the abscissa. Various methods may be proposed to generate this displacement amount curve $y=f(x)$. Some methods are exemplified below.

(1) A function is input from the keyboard. For example, this function can be exemplified as $y=x_2$ ($0 \leq x \leq 4$).

(2) An operator selects several functions and sets their parameters. The selected functions can be exemplified by the Gaussian distribution function $\Delta r(x)$ of equation (1).

(3) A displacement amount curve is interrogatively plotted on a graph drawn on the display by using the P.D. 4 to allow the operator to arbitrarily create a displacement amount curve.

Figure 38:
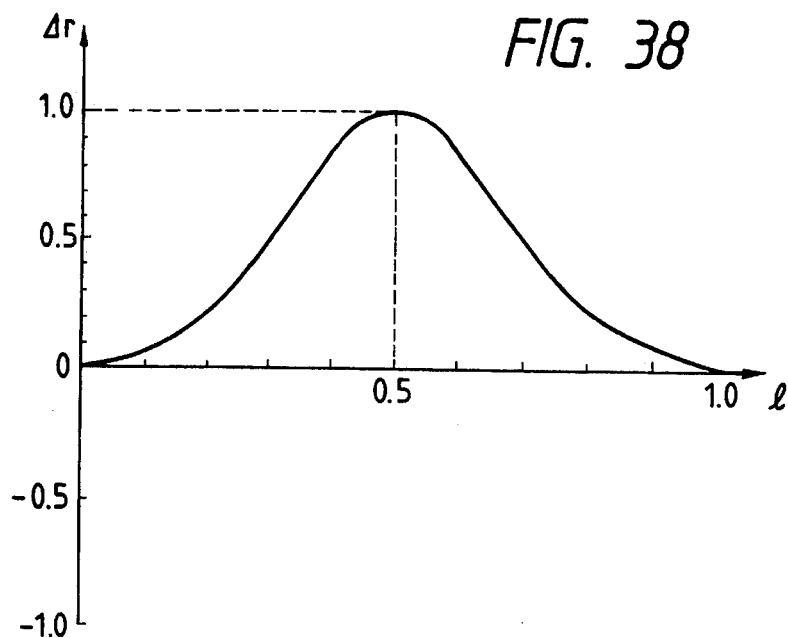
FIG. 38 is a view showing normalized displacement amount data of FIG. 37.

In step S15, the range of values of x and the range of values of y (or $\Delta r(x)$) are normalized. By this normalization, the displacement amounts can be mapped on any primitive figure regardless of its outline. In addition, the displacement amounts can be easily and selectively mapped on any portion of an outline of a primitive figure. In this embodiment, x and y respectively fall within the dynamic ranges of $0 \leq x \leq 7$ and $0 \leq y \leq 4.5$ with respect to the displacement amount curve of FIG. 37. A displacement amount curve obtained by normalizing the above dynamic ranges within the ranges of $0 \leq x \leq 1$ and $-1 \leq y \leq 1$ is shown in FIG. 38:

$$y=f_N(x)\ (0 \leq x \leq, -1 \leq y \leq 1)$$

Figure 36B:
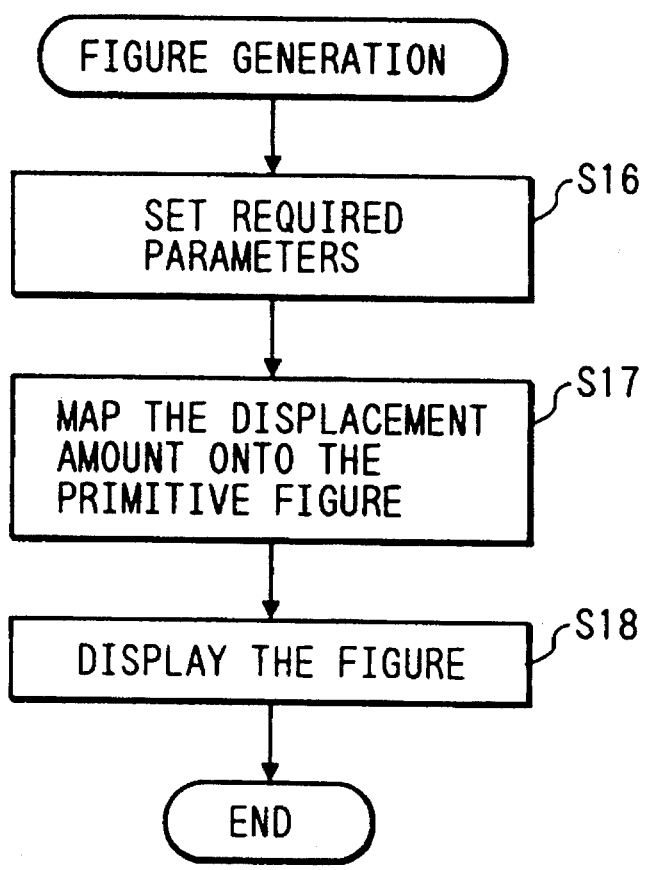
FIG. 36B is a flow chart showing steps of generating a figure from the normalized displacement amount.

The procedures for generating a figure based on the normalized displacement information are shown in FIG. 36B.

In step S16, parameters necessary for displacement amounts to be mapped in step S17 are set. For example, the magnitudes of projections upon mapping can be adjusted by the magnitudes of the dynamic ranges of the displacement amounts. Various parameters are set to designate parts of the primitive figure to which the displacement amounts are to be mapped. In step S17, the displacement amounts stored in a displacement amount storage section 52b are actually mapped onto the primitive figure by using the data associated with the displacement amounts obtained in step S16 and the mapping data.

Figure 39:
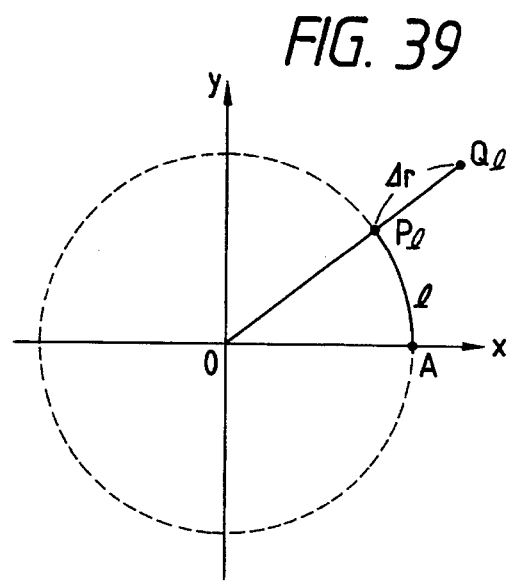
FIG. 39 is a view showing a primitive figure used in mapping of FIGS. 20 to 22.

For example, assume that a primitive figure to be pasted is given as a circle having a radius of "3", as shown in FIG. 39, and a radially outward direction from the origin with respect to points on the circumference is defined as a positive direction for mapping. Any point on the outline is represented by a distance l from a middle point A in FIG. 39 and is defined as Pl. In this case, the circumferential length of the circle is given as 6π, and the distance l falls within the range of $0 \leq l \leq 6\pi$. If a displacement amount of the point Pl in the radial direction is $\Delta r$, and an angle $\angle POA$ is given as θl, the point Ql to be mapped is plotted at a point displaced from the point Pl by $\Delta r \cos \theta l$ on the x-axis and $\Delta r \sin \theta l$ on the y-axis. In this manner, the displacement information normalized in step S15 is mapped on the basis of the parameters set in step S16.

Figure 40:
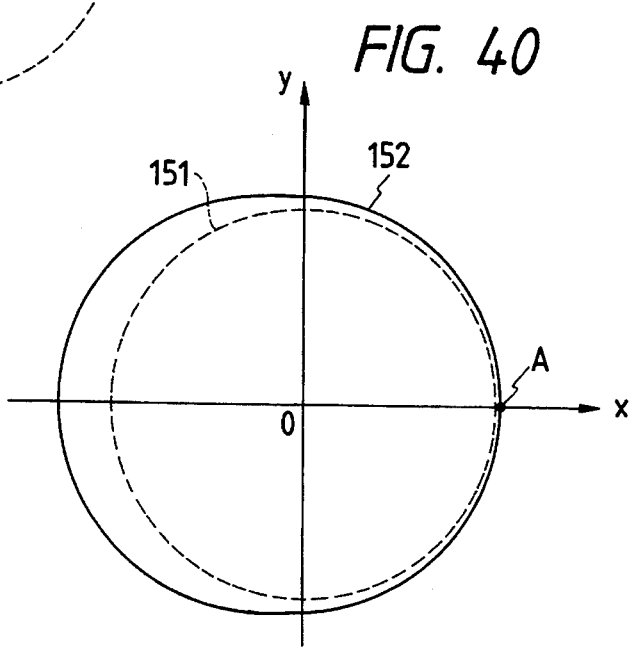
FIGS. 40 to 42 are views showing figures obtained by mapping normalized displacement amount data under different conditions.
Figure 41:
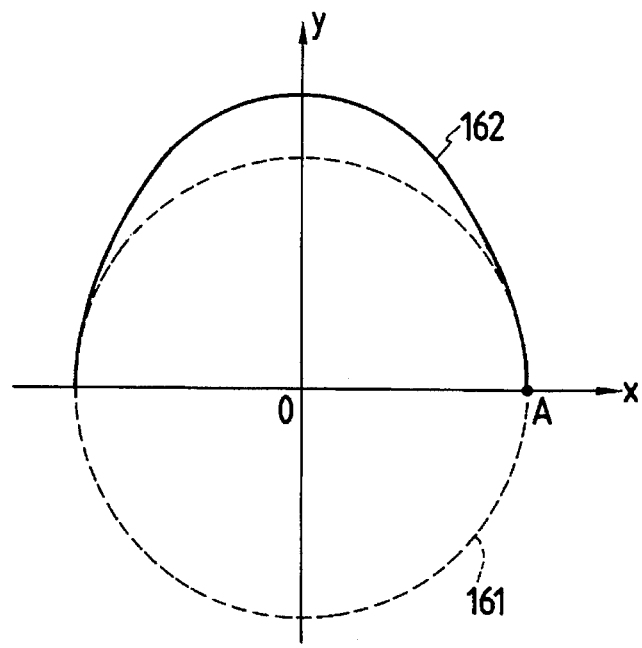

FIG. 40 shows a case wherein a dynamic range of the distance l of the displacement amount curve of FIG. 38 is increased to the range of $0 \leq l \leq 6\pi$, the dynamic range of the distribution function r is set to be $-1.0 \leq \Delta r \leq 1.0$, and a point A is used as a start point so as to map the displacement amounts on an entire primitive figure 151, thereby obtaining a mapped outline figure 152. Similarly, FIG. 41 shows a case wherein the dynamic range of the displacement amount curve is increased to the range of $0 \leq l \leq 3$, the dynamic range of the distribution function $\Delta r$ is set to be $-1.0 \leq \Delta r \leq 1.0$, and a point A is used as a start point so as to map the displacement amounts on one half of the outline of a primitive figure 161, thereby obtaining a mapped outline figure 162. In addition, FIG. 42 shows a case wherein a dynamic range of the distance l of the displacement amount curve of FIG. 38 is increased to the range of $0 \leq l \leq 1.5\pi$, the dynamic range of the distribution function $\Delta r$ is set to be $-1.0 \leq \Delta r \leq 1.0$, and a point B is used as a start point, and then the dynamic range of the function $\Delta r$ is set to be $-2.0 \leq \Delta r \leq 2.0$, so as to map the displacement amounts on ¼ of an entire primitive figure 171 counterclockwise, thereby obtaining a mapped outline figure 173.

In step S18, the outline figures generated upon mapping as described above are stored in the frame memory by the output controller 54 and are displayed on the display device through a D/A display controller. As described above, since the displacement amount curve information is normalized, various outline figures can be easily obtained upon mapping.

[Generation of Displacement Information]

In the above embodiment, the displacement amount curve information consisting of displacement amounts is given as the operator's inputs or the prestored operation expression (Gaussian distribution function). In the following description, a primitive figure and displacement information are extracted from an arbitrary input image to use the extracted information as displacement information of the previous information.

(Arrangement of Figure Generating Apparatus of This Embodiment)

Figure 43:
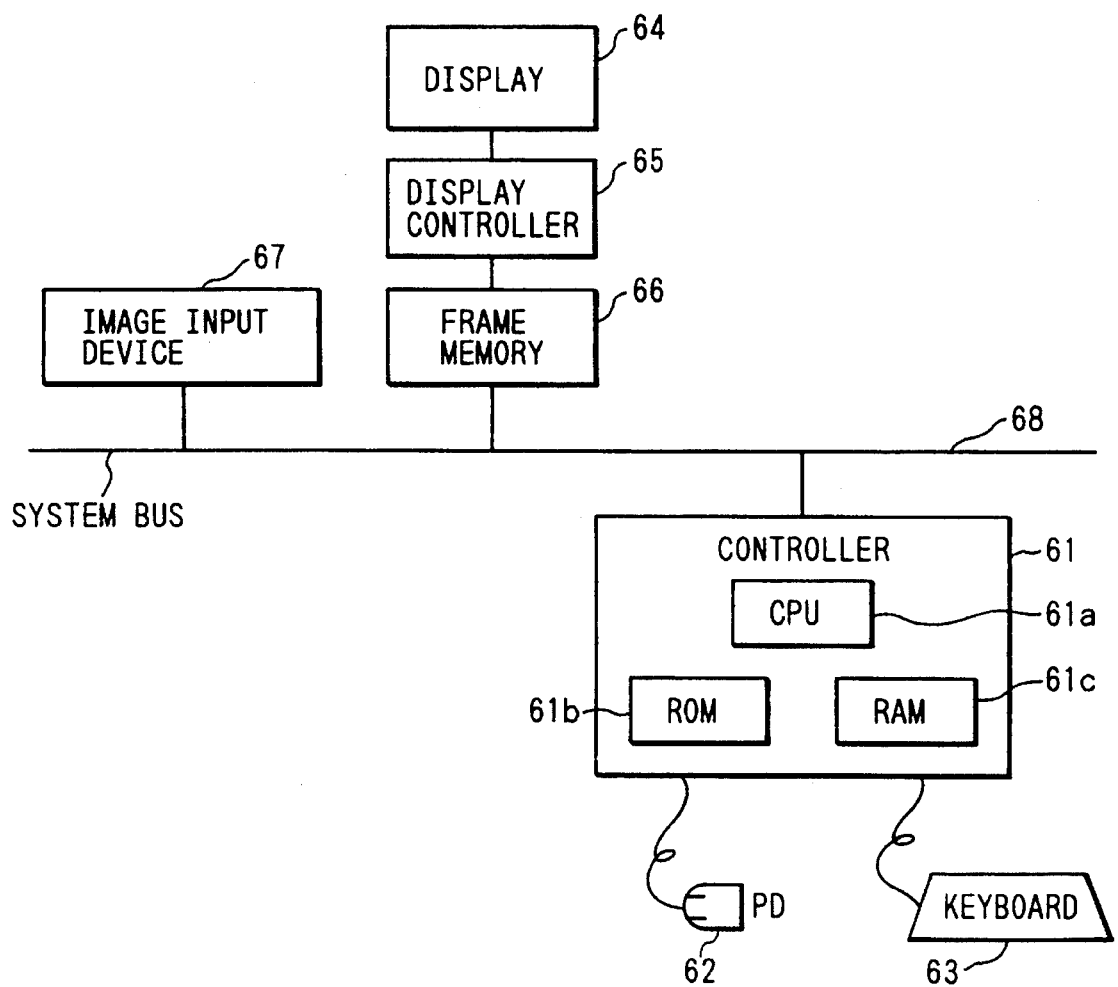
FIG. 43 is a view showing another arrangement of a figure processing apparatus according to still another embodiment of the present invention.

The above displacement information can be generated by a figure generating apparatus shown in FIG. 43. The arrangement of this apparatus is similar to that of FIG. 26.

Figure 44A:
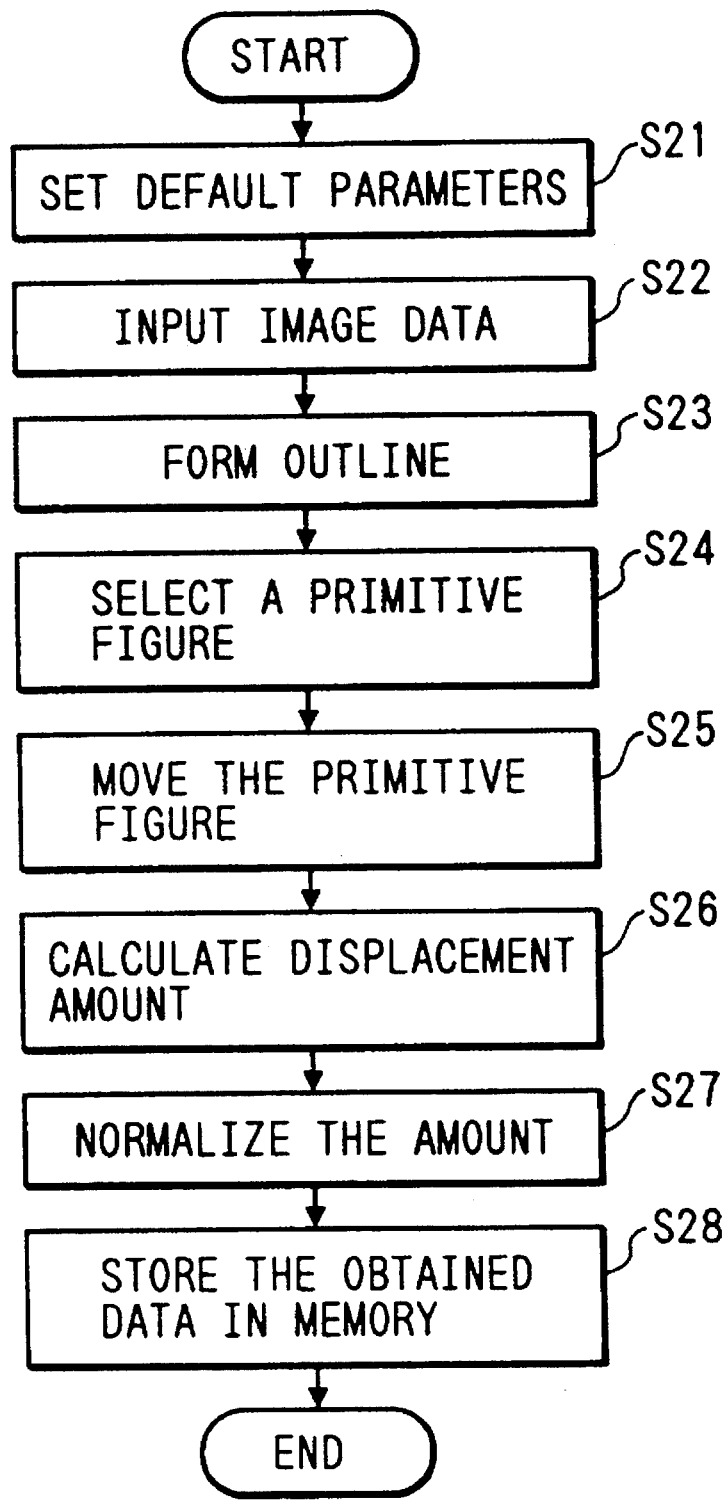
FIG. 44A is a flow chart for explaining an operation of the figure generating apparatus in FIG. 43.
Figure 44B:
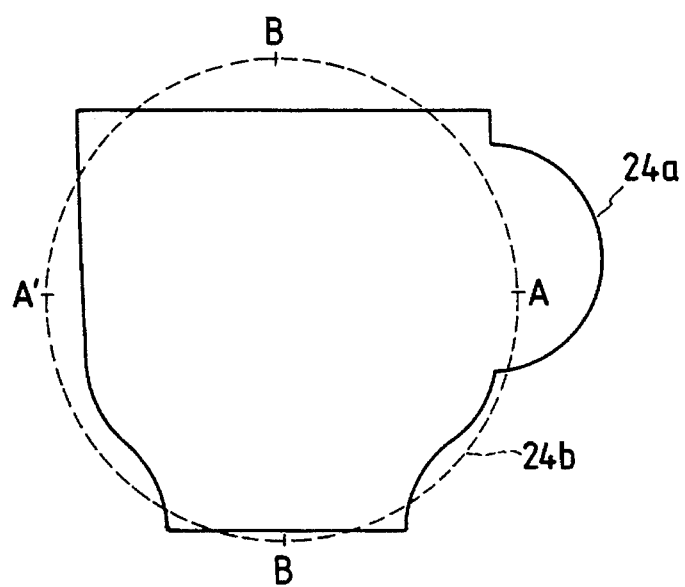
FIG. 44B is a view for explaining an outline figure and a primitive figure from an input image.

An operation of this figure generating apparatus will be described with reference to a flow chart of FIG. 44A and views of FIGS. 44B and 44C. These operations are the same as those described with reference to FIGS. 27 to 31.

In step S21, of all values used in this processing, a CPU 61a of a figure operation controller 61 sets values which are not clearly designated by an operator. At the same time, the CPU 61a initializes a memory, registers, and pointers. In step S22, image data (binary, multivalue chromatic, color data) from an image input device 67 is stored in a frame memory 66 through a bus 68. Processing for extracting an outline of fetched image is performed in step S23. Various outline extraction algorithms have been proposed, and two of them are exemplified below.

(1) An edge of an input image is emphasized by a differential operator such as one differential step, and binary processing is performed to reduce the thickness of the edge, thereby extracting an outline.

(2) An edge of an input image is emphasized by a differential operator such as one differential step, binary processing operation is performed, and then outline tracking is performed. Outline tracking is started with search for a start point for outline tracking. Tracking end marks are assigned to points found during tracking, and tracking progresses. When a tracking cycle is ended, one outline is obtained.

By these outline extraction methods, an outline figure having a line thickness of one pixel can be obtained. If necessary, a P.D. 62 is used to move a cursor to omit unnecessary portions or add desired lines and points. When the operation in step S22 is to be performed, the operator moves the P.D. 62 while observing a display 64, thereby moving the cursor to the "input" item in a menu area assigned in a display screen. When the button of the P.D. 62 is depressed, processing in step S22 is started. In this manner, the operator performs processing interrogatively while observing the display. When the operation in step S22 is completed, an input image is displayed on the display screen.

In order to execute the operation in step S23, an outline extraction menu is selected by using the P.D. 62. The outline extraction processing described above is executed, and an image such as an outline figure 101 shown in FIG. 44B is displayed on a display screen. This image is the same as that obtained in FIG. 21. This image is stored as pixel value data at a predetermined address of the frame memory 66. In steps S24 and S25, a primitive figure is selected and moved. Selection and movement of a primitive figure can be performed by designating a type, a size, and a position of a primitive figure by using the P.D. 62 or a keyboard 63. An outline figure 24a and a primitive figure 24b are displayed as on a display screen.

Figure 44C:
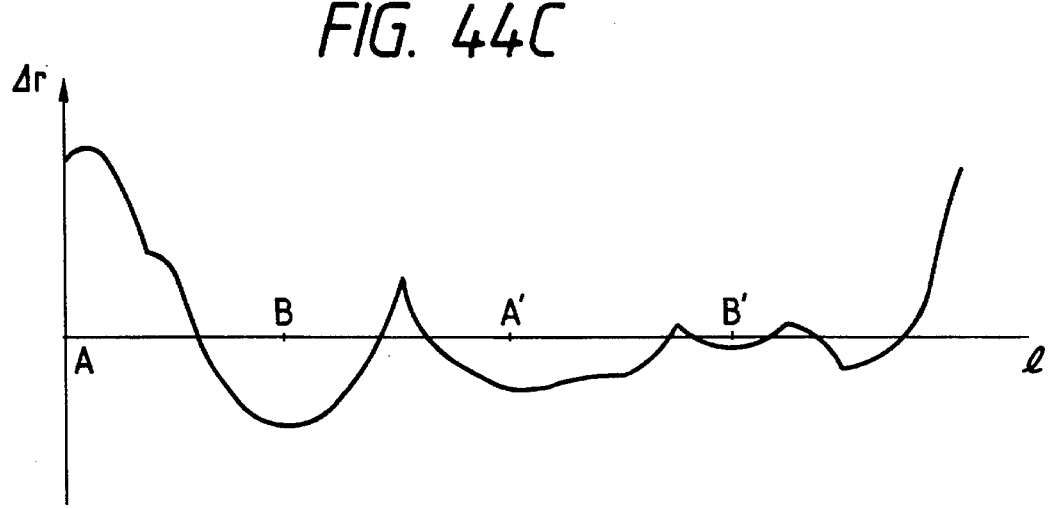
FIG. 44C is a view showing displacement amount data obtained from an input image.

In step S26, a displacement amount curve shown in FIG. 44C with respect to a primitive figure (a circle in this case) can be obtained by the principle described above. In FIG. 44C, a displacement amount $\Delta r$ having a positive value outside the reference position in the normal direction is plotted along the ordinate, and a distance l from the reference point on the outline of the mapped figure is plotted along the abscissa. In step S28, primitive figure information (attributes, size, and position of the primitive figure) and the displacement amount curve data are stored in a normalized amount storage section 52c.

In this manner, the outline figure defined as pixel values for two-dimensional addresses in the frame memory 66 can be converted into another data form. When a technique is employed to map the displacement amounts corresponding to the respective points of the primitive figure on the basis of the resultant primitive figure information and the displacement amount information, the original outline figure can be obtained. When the primitive figure information and the displacement amount curve information are obtained, a figure can be modified based on these pieces of information.

Figure 44D:
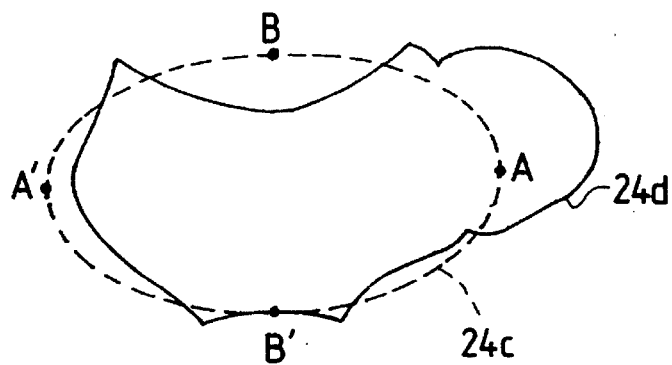
FIG. 44D is a view showing displacement amount data (FIG. 44C) mapped with an ellipse.

Assume that the displacement amount curve of FIG. 44C is mapped on an ellipse 24C (major axis AA'=2a, minor axis BB'=2b) of FIG. 44D. When an entire circumferential length S is obtained as follows assuming coordinates of points A and B are given as (a,0) and (b,0):

$$S = 4a \int_0^{\pi/2} \sqrt{10(1 - b^2/a^2)\sin^2\theta} \ d\theta$$

Since the displacement amount curve of FIG. 41 is a curve obtained when the circumferential length of the figure to be mapped is $2\pi r$, direct mapping cannot be performed for the ellipse 24c of FIG. 44D. In order to eliminate this drawback, the dynamic range of the distance l of the displacement amount curve of FIG. 44D is normalized to be $0 \leq l \leq 1$, and the dynamic range of the displacement amount $\Delta r$ is normalized to be $-1.0 \leq \Delta r \leq 1.0$. The dynamic range of the distance l of the normalized displacement amount curve is multiplied with the circumferential length S of the ellipse. The resultant figure obtained by mapping the displacement amounts with respect the points on the ellipse in the normal direction is a generated figure 24d shown in FIG. 44D.

As described above, since the outline extracted figure is expressed by the prestored primitive figure information and the displacement amount curve information expressed by displacement amounts from the reference point of the primitive figure in the reference direction, the following effects are obtained.

(1) Unlike the conventional technique in which a shape is created from nothing, a new two-dimensional figure can be generated by using outlines of already existing objects and images.

(2) When the resultant outline figure is to be further modified, a shape can be intuitively recognized, and steps of defining the shape for drawing can be reduced. Thus, operability and interrogation performance are improved.

(3) Displacement amount data used for a primitive figure can be mapped on an outline of another primitive figure to easily generate another shape having a similar shape.

According to this embodiment, there is provided a method of generating a two-dimensional (planar) figure, wherein various shapes can be generated on a primitive figure, and a shape pattern on a primitive figure can be utilized for another primitive figure to obtain a new outline shape.

[Embodiment for Generalizing Figure By Connecting and Arranging Parts]

Figure 45A:
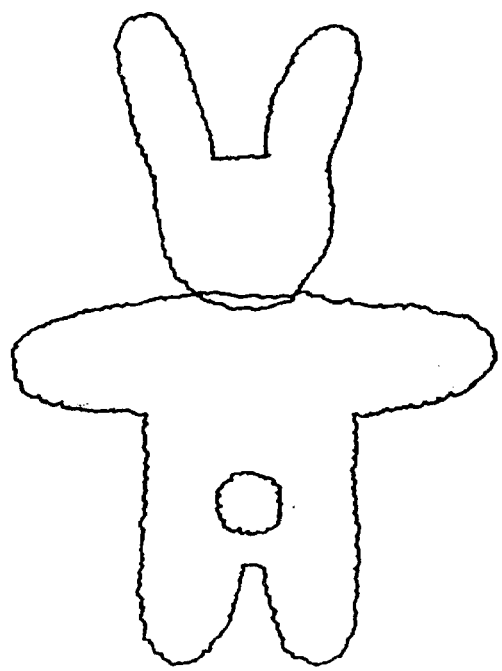
FIG. 45A is a view showing a figure which is decomposed into parts.
Figure 46A:
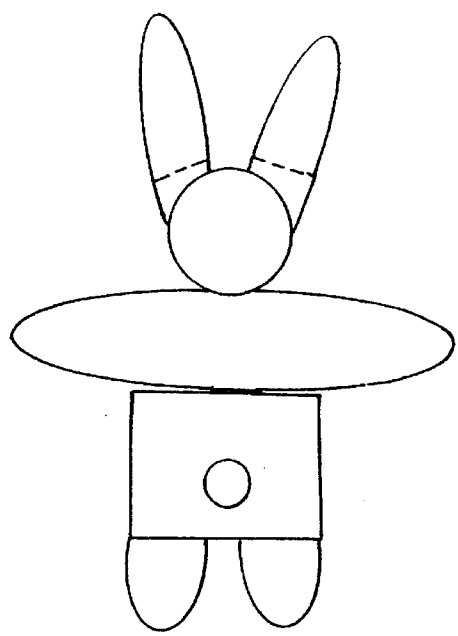
FIG. 46A is a view showing a rough shape of an original figure obtained by using only primitive figures.
Figure 46B:
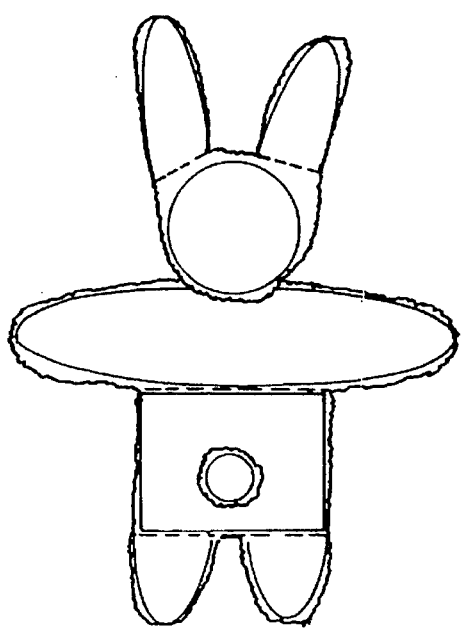
FIG. 46B is a view showing a figure obtained by FIG. 46A.

The principle of this embodiment will be described below. In this embodiment, a shape shown in FIG. 45A is divided into simple, small portions (to be also referred to as parts hereinafter), and the small portions are caused to correspond to the existing outline portions of the outlines such as a circle, an ellipse, and a rectangle to store them in the form of displacement amount data, as shown in FIG. 45C. In figure creation, as shown in FIG. 46A, displacement amount data are added to the respective existing outlines of FIG. 46A to generate a new figure shown in FIG. 46B. Note that the original figure can be reproduced when the displacement amount data are obtained from FIG. 45C.

The displacement data are caused to correspond to the respective points on the outline of a primitive figure and are used to represent displacement positions from the points on the outline of the primitive figure in the normal direction of the outline. The displacement data may be used as displacement amounts from the center of a primitive figure (e.g., an intersection of diagonal lines in a rectangle, or the center of an ellipse) in a radial line passing through each point on the outline of the primitive figure.

(Arrangement of Figure Generating Apparatus of This Embodiment)

Figure 47:
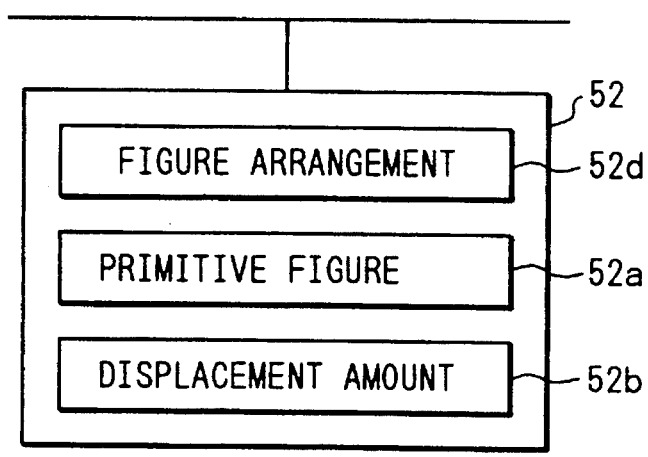
FIG. 47 is a view showing an arrangement of a figure generating apparatus for separating a figure into parts.

A characteristic feature of the figure generating apparatus for storing figures or realizing the generation method is a figure arrangement storage section 52d for arranging positions of the respective parts and their associative items in a RAM 52, as shown in FIG. 47. Other arrangements of this apparatus are the same as those in FIG. 13. An internal structure of the figure arrangement storage section 52d will be described below.

Figure 48A:
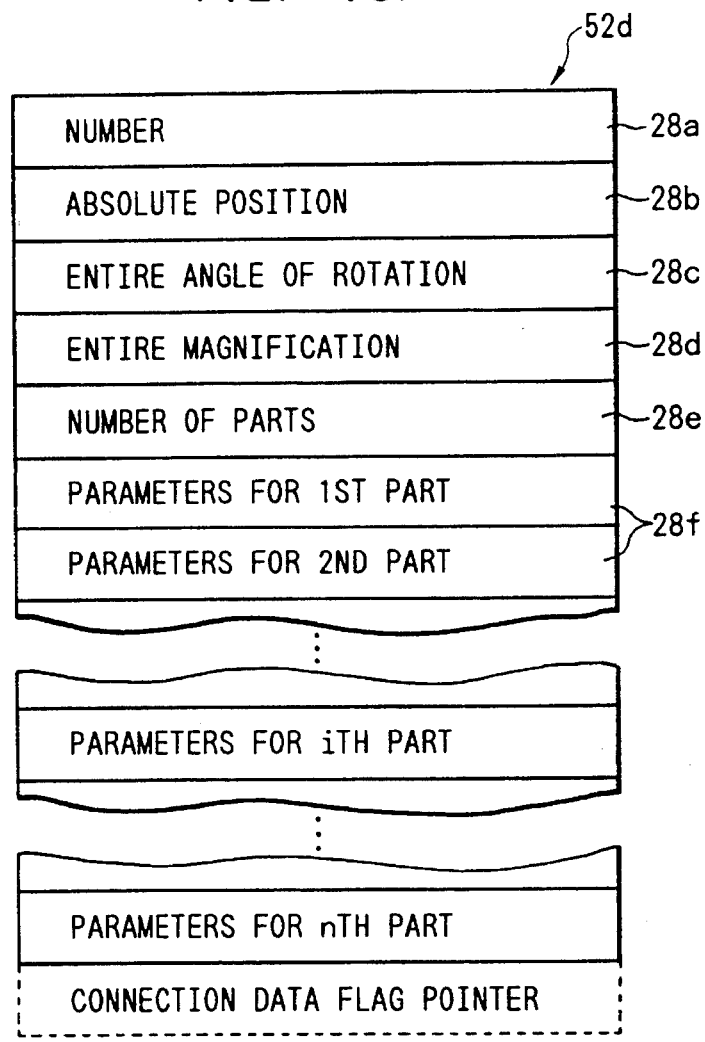
FIG. 48A is a view showing a format of edited data.
Figure 48B:
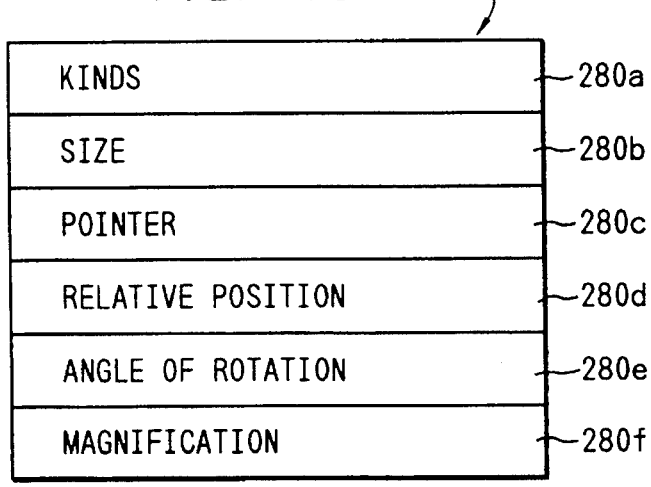
FIG. 48B is a view showing a format of parts data of a shape.

FIG. 48A shows a data format showing an arrangement of an entire edited figure. This figure is defined as a set of a plurality of parts figures. This set is defined as one data file in an external memory. The parameter data of the respective parts have a list structure in a real memory so as to allow random editing. The file includes data of a number 28a assigned to the entire unit of parts included in the file, an absolute position 28b of the entire unit of parts in the image, an entire angle 28c of rotation, an entire magnification 28d, and the number 28e of parts included in the entire unit. FIG. 48B shows a detailed arrangement of a data format of each parts 28f. Each parts can be generated by pasting displacement amounts on the outline of the primitive figure. For this reason, each parts has a code 280a for designating a kind of primitive figure (e.g., a circle, an ellipse, or a rectangle), a parameter 280b for determining a size of the primitive figure, a relative position 280d in the entire primitive figure (i.e., a unit of shape as a set of parts), a pointer 280c for displacement data added to the surface of the primitive figure, an angle 280e of rotation in the entire unit of parts, and a magnification 280f.

Figure 49A:
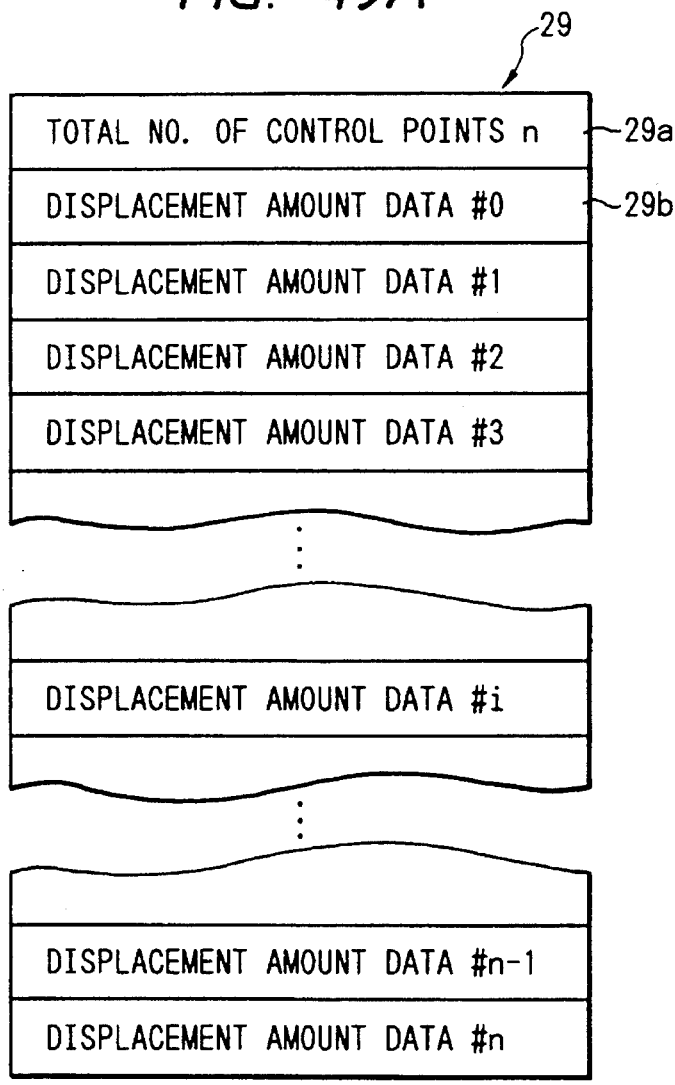
FIG. 49A is a view showing a format of displacement data.
Figure 49B:
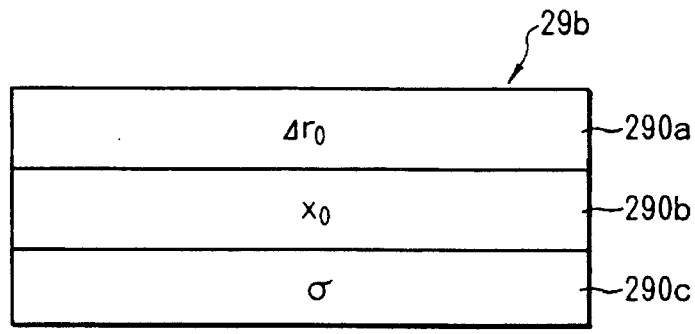
FIG. 49B is a view showing a format of one displacement amount data of the displacement data.

FIG. 49A shows a data format of displacement data 29 in the displacement amount storage section which is pointed by the pointer 280c. Displacement data in this embodiment uses a Gaussian distribution shape and includes n displacement data 29b as a total number 29a of control points. Each displacement data 29b has data of $\Delta\gamma$ 290a (height of Gaussian distribution), $x_0$ 290b (position of Gaussian distribution), and $\sigma$ 290c (range of Gaussian distribution) as parameters.

Figure 50:
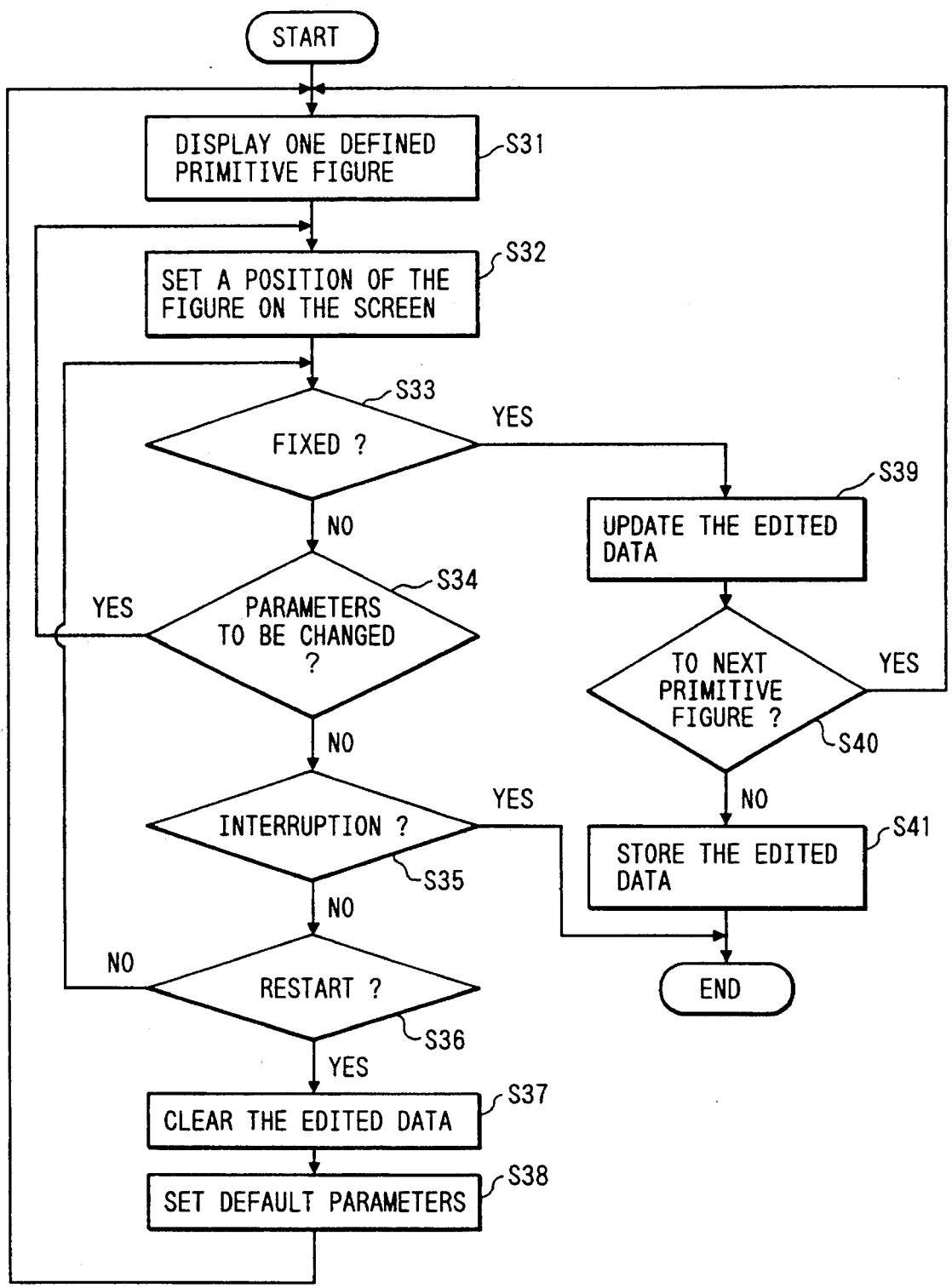
FIG. 50 is a flow chart showing editing procedures of shape parts.

The arrangement of the primitive figures is determined in the data structure of the figure arrangement storage section 52d in accordance with the sequence shown in FIG. 50.

In step S31, a primitive figure set with displaced data is displayed on the display device 3 and is edited to obtain image parts. In step S32, the operator sets an arrangement position, a magnification, and an angle with respect to the horizontal direction while observing a positional relationship on the screen. It is then determined in step S33 whether the arrangement of the parts is fixed under the set conditions. If NO in step S33, the flow advances to step S34 to continue parts editing, thereby determining whether the parameters are changed. If the parameters are to be changed, the flow returns to step S32 to set new parameter values again. If no parameter value setup is designated, the flow advances to step S35 to check whether interruption is designated. If YES in step S35, a series of operations is ended. However, if NO in step S35, the flow advances to step S36 to determine whether a restart command is input. If NO in step S36, the flow returns to step S33 to check a series of designations instructed by the operator.

If YES in step S36, the flow advances to step S37, all existing edited data stored in the real memory are cleared, and a parts display is set in an initial state. The initial state indicates a default value of the apparatus. In step S38, the parts are displayed again in accordance with the default value set in step S37.

In step S33, when fixing designation is determined, all the existing parts edited data stored in a temporary storage area are written in a memory table having data formats shown in FIG. 48A and 48B. It is determined in step S40 whether processing advances to other parts. When designation for specifying an advance to the next primitive figure is determined, the flow returns to step S31 to edit the next parts. When designation for shifting editing to the next primitive figure is not allowed, edited data shown in FIGS. 48A and 48B are stored in an external memory in step S41.

(Recognition of Figure)

A method of generating displacement amount data is not limited to the Gaussian distribution as in the next figure processing command in this embodiment. As described in the principle of this embodiment, a figure drawn on an existing illustration book is read, an outline of a read figure is extracted (e.g., processing by a quadratic differential operator or the like), and the figure is separated into parts. Primitive figures having appropriate sizes are applied to the outline of each parts, and distances (e.g., an intersection between an extracted outline and a line obtained by connecting the central point of a primitive figure and each point on the outline of the primitive figure is defined as an extracted curve point corresponding to the point on the outline of the primitive figure) may be stored as change data.

The processing sequence of the above operation is shown in FIG. 51.

Of all values used in this processing, the CPU 61a of the figure operation controller 61 sets values which are not clearly set by the operator. At the same time, the CPU 61a initializes a memory, registers, and pointers. In step S52, image data (e.g., binary, multivalue monochromatic, or color image data) is stored from the image input I/O device 67 to the frame memory 66 through the bus 68. In step S53, the outline of the fetched image is extracted in the same manner as in step S23. This state is shown in FIG. 45A. In step S54, the figure is separated into portions (parts), as shown in FIG. 45A. Note that the number of displacement data from a primitive figure stored in the apparatus should not exceed a predetermined value.

In steps S55 and S56, a primitive figure is selected and moved. Selection and movement are performed to designate a kind of primitive figure, its size, and its position with the P.D. 62 and the keyboard 63. It is determined in step S57 whether a position of a primitive figure is settled. If YES in step S57, the flow advances to step S58 to store a primitive figure position.

In step S59, a displacement amount curve for the primitive figure is obtained in accordance with the principle described previously. In step S60, the displacement amounts are stored in correspondence with the primitive figure. The CPU 61a determines in step S61 whether all parts constituting all parts are processed. If NO in step S61, the flow returns to step S55, and separation of the primitive figures of other parts from the displacement amounts is performed. When processing of all the parts is completed, the primitive figure arrangement, the primitive figure data (e.g., attributes, sizes, and positions of the primitive figures), and the displacement amount curve data of each primitive figure are stored in the memory.

In this manner, the outline figure defined as pixel values for two-dimensional addresses in the frame memory 66 is converted into another data form. When a technique for mapping the displacement amounts corresponding to the respective points of the primitive figure on the basis of the resultant primitive figure data and displacement amount data is employed, the original outline figure can be obtained. When the primitive figure data and the displacement amount curve data are obtained, the figure is modified on the basis of the resultant data.

As described above, each figure constituting an original figure is separated into local elements, and local figures modified in units of constituting elements are combined to arrange a figure. A more complex shape can be generated interrogatively with good operability as compared with the conventional technique. Parts of given shape data are utilized and combined to obtain another shape.

According to the present invention, there is provided a method of easily generating a two-dimensional (planar) figure, wherein various shapes are formed on the primitive figures, and a shape pattern realized on a primitive figure can be utilized for another primitive figure to obtain a new outline shape.

There is provided a method of generating a figure, which can be easily utilized for primitive figures having different sizes (e.g., the lengths of long and short sizes of rectangles and the major and minor axes of ellipses) and different kinds of primitive figures (e.g., an ellipse, a rectangle, and a triangle).

The entire image of a desired final figure is assumed on a primitive figure, and local modifications and shape correction are interrogatively performed on this primitive figure, thereby easily generating a more complex shape.

Furthermore, any shapes obtained by mapping displacement amounts on the outline of a primitive figure are defined as parts, and these parts are connected and arranged to edit a figure, thereby easily and interrogatively generating a more complex shape.

What is claimed is:

1. Graphics processing apparatus comprising:

processor means for extracting an outline figure from image data; and memory means for storing the outline figure as shape data representing the shape of a primitive figure, displacement data representing a displacement from the primitive figure and position data representing a positional relation between the shape data and the displacement data;

said processor means being operative to change the displacement data to generate a new outline figure.

2. Graphics processing apparatus comprising:

storage means for storing shape data representing the shape of a primitive figure; and processor means responsive to the stored shape data for generating displacement data representing a displacement from the primitive figure and position data representing a positional relation between the shape data and the displacement data, wherein the processing means adds the shape data to the displacement data of the primitive figure to obtain shape data of a new outline figure.

3. An apparatus according to claim 2, wherein the displacement data is formed in said processor means as a sum of a plurality of local displacements.

4. An apparatus according to claim 3, wherein the displacement data uses a Gaussian distribution function.

5. An apparatus according to claim 4, wherein the displacement data is stored in said storage means in a form of a displacement position, a displacement range, and a maximum or minimum displacement amount.

6. An apparatus according to claim 2, wherein said processor means obtains the displacement data from a displacement of an outline figure extracted from image data from a primitive figure.

7. Graphics processing apparatus comprising:

first processor means for normalizing displacement data representing a displacement from shape data representative of a shape of a primitive figure and position data representative of a positional relation of the shape data and the displacement data of a primitive figure;

storage means for storing the normalized shape displacement data;

second processor means responsive to the stored normalized shape displacement data for changing the normalized displacement data into a desired size, and for mapping the size-changed normalized displacement data on data of a given primitive figure; and output means for outputting the mapped data from the second processing means.

8. An apparatus according to claim 7, wherein the primitive figure for obtaining the displacement data is different from the given primitive figure to be mapped.

9. Graphics processing apparatus comprising:

input means for inputting a figure;

storage means for storing the input figure;

first processing means for separating the figure stored in said storage means into a plurality of partial shapes; and second processing means for generating shape data representing each of the separated partial shapes as a shape of a primitive figure, for generating displacement data representing a displacement from the primitive figure, and for generating position data representing a positional relation between the shape data and the displacement data.

10. An apparatus according to claim 9, wherein said second processing means forms a desired figure by editing and arranging the plurality of partial shapes.

11. An apparatus according to claim 10, wherein said second processing means performs editing for forming the desired figure from the plurality of partial shapes by using only primitive figures and adding the displacement data to generate a figure after an entire arrangement of all partial shapes is determined.

12. Graphics processing apparatus comprising:

storage means for storing outline information of a plurality of primitive figures, the outline information including shape data representing the shape of each of the primitive figures, displacement data representing a displacement from the primitive figure and position data representing a positional relation between the shape data and the displacement data;

processing means for selecting a desired one of the plurality of primitive figures and for changing the displacement data of the selected primitive figure to modify the outline information thereof into new outline information; and output means for outputting the new outline information.

13. An apparatus according to claim 12, wherein said storage means stores change information, and said processing means changes the outline information of the selected primitive figure using the stored change information.

14. An apparatus according to claim 12, further comprising input means for inputting a figure, and wherein said processing means changes the outline information of the selected primitive figure in correspondence to the input figure.

15. An apparatus according to claim 12, further comprising input means for inputting a figure and wherein said processing means divides the input figure into a plurality of blocks and selects a desired primitive figure for each of the plurality of blocks.

16. An apparatus according to claim 15, wherein said processing means synthesizes the changed figures and said output means outputs the figure resulting from the synthesis.

17. In a graphics processing apparatus having at least a figure processor, a display and a data store, a figure processing method comprising the steps of:

extracting an outline figure from image data of a figure displayed on the display in the figure processor and displaying the outline figure on the display;

storing in the data store shape data of a primitive figure in the displayed outline figure, displacement data representing a displacement of the displayed outline figure from the primitive figure and position data representing a positional relation between the shape data and the displacement data; and modifying the stored displacement data to generate a new outline figure for display in the figure processor.

18. In a graphics processing apparatus having at least a figure processor, a display and a data store, a figure processing method comprising the steps of:

storing shape data of a displayed primitive figure in data store; and generating displacement data in the figure processor representing a displacement from the primitive figure and position data representing a positional relation between the shape data and the displacement data, wherein the stored shape data of the primitive figure and the generated displacement data are added to each other in the figure processor to produce shape data of an outline figure for display on the display.

19. A method according to claim 18, wherein the displacement data is formed as a sum of a plurality of local displacements.

20. A method according to claim 19, wherein the displacement data uses a Gaussian distribution function.

21. A method according to claim 20, wherein the displacement data is stored in a form of a displacement position, a displacement range, and a maximum or minimum displacement amount.

22. A method according to claim 18, further comprising the step performed in said figure processor of obtaining the displacement data from a displacement of an outline figure extracted from image data from a primitive figure.

23. In a graphics processing apparatus having at least a figure processor and a data store, a figure processing method comprising the steps of:

generating in the figure processor displacement data representing a normalized displacement from shape data representative of a shape of a primitive figure and position data representative of a positional relation of the shape data and the displacement data of a primitive figure;

storing the normalized shape displacement data in the data store;

changing the stored normalized displacement data into a desired size in said figure processor; and mapping the size-changed normalized displacement data on data of a given primitive figure in a mapping processor; and outputting the data from said mapping processor.

24. A method according to claim 23, wherein the primitive figure for obtaining the displacement data is different from the given primitive figure to be mapped.

25. In a graphics processing apparatus having at least a figure processor and a data store, a figure processing method comprising the steps of:

inputting a figure;

storing the input figure in the data store;

separating the figure stored in said store into a plurality of partial shapes in the figure processor; and forming representations of each of the separated partial shapes by shape data representing a shape of a primitive figure, displacement data representing a displacement from the primitive figure, and position data representing a positional relation between the shape data and the displacement data in the figure processor.

26. A method according to claim 25, further comprising the step of obtaining a desired figure by editing and arranging the plurality of partial shapes in the figure processor.

27. A method according to claim 26, wherein the step of editing to obtain the desired figure from the plurality of partial shapes is performed in the figure processor by using only primitive figures and adding the displacement data to generate a figure after an entire arrangement of all partial shapes is determined.

28. In a graphics processing apparatus having at least a figure processor and a data store, a figure processing method comprising the steps of:

in the data store, storing outline information of a plurality of primitive figures, the outline information including shape data representing the shape of each of the primitive figures, displacement data representing a displacement from the primitive figure and position data representing a positional relation between the shape data and the displacement data;

in the figure processor, selecting a desired one of the plurality of primitive figures and changing the displacement data of the selected primitive figure to modify the outline information thereof into new outline information; and outputting the new outline information from the figure processor.

29. A method according to claim 28, further comprising the step of storing change information in the data store, wherein the outline information of the selected primitive figure is changed in the figure processor using the stored change information.

30. A method according to claim 28, further comprising the step of inputting a figure and wherein the outline information of the selected primitive figure is changed by the figure processor in correspondence to the input figure in the figure processor.

31. A method according to claim 28, further comprising the steps of inputting a figure and dividing the input figure into a plurality of blocks in the figure processor so that a desired primitive figure is selected for each of the plurality of blocks.

32. A method according to claim 31, further comprising the step of synthesizing the figure changed in the figure processor, and wherein the figure resulting from the synthesis in the figure processor is output.

* * * * *

UNITED STATES PATENT AND TRADEMARK OFFICE
CERTIFICATE OF CORRECTION

PATENT NO. : 5,457,755
DATED : October 10, 1995
INVENTOR(S) : YOSHIHIRO ISHIDA ET AL.   Page 1 of 2

It is certified that error appears in the above-identified patent and that said Letters Patent is hereby corrected as shown below:

COLUMN 5

Line 5, "[First" should read --¶ [First--.
Line 37 "corresponds" should read --correspond--.
Line 56 "inside" should read --inside of--.

COLUMN 6

Line 30 ""22"" should read --"24",--.

COLUMN 9

Line 38 "[Second" should read --¶ [Second--.
Line 55 "Fig. 11" should read --figure 11--.
Line 64 "P$_o$O" should read -- $\overline{P_oO}$ --.

Line 65 "Fig. 11" should read --figure 11--.

COLUMN 10

Line 13 "OP" should read -- $\overline{OP}$ --.

Line 14 "origin 0" should read --origin O--.
Line 17 "OP" should read -- $\overline{OP}$ --.

UNITED STATES PATENT AND TRADEMARK OFFICE
CERTIFICATE OF CORRECTION

PATENT NO. : 5,457,755
DATED : October 10, 1995
INVENTOR(S) : YOSHIHIRO ISHIDA ET AL.    Page 2 of 2

It is certified that error appears in the above-identified patent and that said Letters Patent is hereby corrected as shown below:

COLUMN 13

Line 11 "Fig. 141" should read --figure 141--.

COLUMN 14

Line 58 "$y=f_N(x)(0 \leq x \leq, -1 \leq y \leq)$ should read --$y=f_N(x)(0 \leq x \leq 1, -1 \leq y \leq 1)$--.

COLUMN 18

Line 35 "parts" (both occurrences) should read --part--.
Line 37 "parts" should read --part--.

COLUMN 20

Line 2 close up right margin.
Line 3 close up left margin.

Signed and Sealed this

Sixteenth Day of April, 1996

BRUCE LEHMAN

*Attest:*

*Attesting Officer*    Commissioner of Patents and Trademarks